(12) United States Patent
Loginov et al.

(10) Patent No.: US 12,458,999 B2
(45) Date of Patent: Nov. 4, 2025

(54) MAGNETIC ASSEMBLIES AND METHODS FOR PRODUCING OPTICAL EFFECT LAYERS COMPRISING ORIENTED PLATELET-SHAPED MAGNETIC OR MAGNETIZABLE PIGMENT PARTICLES

(71) Applicant: SICPA HOLDING SA, Prilly (CH)

(72) Inventors: Evgeny Loginov, Renens (CH); Christophe Baudraz, Orbe (CH); Claude-Alain Despland, Bussigny (CH)

(73) Assignee: SICPA HOLDING SA, Prilly (CH)

( * ) Notice: Subject to any disclaimer, the term of this patent is extended or adjusted under 35 U.S.C. 154(b) by 476 days.

(21) Appl. No.: 17/927,832

(22) PCT Filed: May 21, 2021

(86) PCT No.: PCT/EP2021/063620
§ 371 (c)(1),
(2) Date: Nov. 25, 2022

(87) PCT Pub. No.: WO2021/239607
PCT Pub. Date: Dec. 2, 2021

(65) Prior Publication Data
US 2023/0201872 A1 Jun. 29, 2023

(30) Foreign Application Priority Data
May 26, 2020 (EP) .................................... 20176506

(51) Int. Cl.
*B42D 25/369* (2014.01)
*B05D 3/00* (2006.01)
(Continued)

(52) U.S. Cl.
CPC ............. *B05D 3/207* (2013.01); *B05D 3/067* (2013.01); *B05D 5/065* (2013.01); *B42D 25/369* (2014.10); *H01F 7/0205* (2013.01)

(58) Field of Classification Search
CPC ........ B05D 3/067; B05D 3/207; B05D 5/065; H01F 7/0205; B42D 25/369; G02F 1/0081
See application file for complete search history.

(56) References Cited

U.S. PATENT DOCUMENTS 2,418,479 A   4/1947   Pratt et al.
2,570,856 A   10/1951  Pratt et al.
(Continued)

FOREIGN PATENT DOCUMENTS

CN   1540687   10/2004
CN   1820181   8/2006
(Continued)

OTHER PUBLICATIONS

China Patent Office Action in counterpart Chinese Application No. 202180037355.6 dated Jun. 14, 2023 (and English language translation of Office Action).
(Continued)

Primary Examiner — Holly Rickman
Assistant Examiner — Linda N Chau
(74) Attorney, Agent, or Firm — Muncy, Geissler, Olds & Lowe, P.C.

(57) ABSTRACT

The invention relates to the field of the protection of security documents such as for example banknotes and identity documents against counterfeit and illegal reproduction. In particular, the present invention provides magnetic assemblies and methods for producing optical effect layers (OELs) on a substrate, said method comprising a step of exposing a coating composition comprising platelet-shaped magnetic or
(Continued)

magnetisable pigment particles to the magnetic field of the magnetic assembly so as to bi-axially orient at least a part of the platelet-shaped magnetic or magnetisable pigment particles.

20 Claims, 9 Drawing Sheets

(51) Int. Cl.
*B05D 3/06* (2006.01)
*B05D 5/06* (2006.01)
*H01F 7/02* (2006.01)

(56) References Cited

U.S. PATENT DOCUMENTS

| | | | |
|---|---|---|---|
| 3,676,273 | A | 7/1972 | Graves |
| 3,791,864 | A | 2/1974 | Steingroever |
| 4,838,648 | A | 6/1989 | Phillips et al. |
| 5,364,689 | A | 11/1994 | Kashiwagi et al. |
| 5,630,877 | A | 5/1997 | Kashiwagi et al. |
| 6,103,361 | A | 8/2000 | Batzar et al. |
| 6,410,130 | B1 | 6/2002 | Schuhmacher et al. |
| 6,531,221 | B1 | 3/2003 | Schuhmacher et al. |
| 6,582,781 | B1 | 6/2003 | Schuhmacher et al. |
| 6,838,166 | B2 | 1/2005 | Phillips et al. |
| 8,025,952 | B2 | 9/2011 | Raksha et al. |
| 8,286,551 | B2 | 10/2012 | Gygi |
| 8,343,615 | B2 | 1/2013 | Raksha et al. |
| 2002/0160194 | A1 | 10/2002 | Phillips et al. |
| 2004/0009308 | A1 | 1/2004 | Schlaf et al. |
| 2004/0212472 | A1 | 10/2004 | Senda et al. |
| 2005/0106367 | A1 | 5/2005 | Raksha et al. |
| 2006/0219107 | A1 | 10/2006 | Gygi |
| 2007/0172261 | A1 | 7/2007 | Raksha et al. |
| 2013/0084411 | A1 | 4/2013 | Raksha et al. |

FOREIGN PATENT DOCUMENTS

| | | |
|---|---|---|
| CN | 102529326 | 8/2014 |
| DE | 2006848 | 9/1971 |
| DE | 102010041389 | 3/2012 |
| EP | 0406667 | 1/1995 |
| EP | 0710508 | 5/1996 |
| EP | 0686675 | 2/1998 |
| EP | 1666546 | 6/2006 |
| EP | 1674282 | 6/2006 |
| EP | 1710756 | 10/2006 |
| EP | 1961559 | 8/2008 |
| EP | 2157141 | 2/2010 |
| EP | 1648702 | 3/2010 |
| EP | 1819525 | 3/2010 |
| EP | 2263806 | 12/2010 |
| EP | 2263807 | 12/2010 |
| EP | 2306222 | 4/2011 |
| EP | 2325677 | 5/2011 |
| EP | 2468423 | 6/2012 |
| EP | 2402401 | 11/2013 |
| EP | 3224055 | 8/2018 |
| EP | 3587500 | 1/2020 |
| JP | 3288330 | 12/1991 |
| KR | 1020100052870 | 5/2010 |
| WO | 2002009002 | 1/2002 |
| WO | 2002073250 | 9/2002 |
| WO | 2002090002 | 11/2002 |
| WO | 2003000801 | 1/2003 |
| WO | 2004007095 | 1/2004 |
| WO | 2005002866 | 1/2005 |
| WO | 2006061301 | 6/2006 |
| WO | 2006063926 | 6/2006 |
| WO | 2007131833 | 11/2007 |
| WO | 2008046702 | 4/2008 |
| WO | 2010058026 | 5/2010 |
| WO | 2011092502 | 8/2011 |
| WO | 2012104098 | 8/2012 |
| WO | 2013167425 | 11/2013 |
| WO | 2014108303 | 7/2014 |
| WO | 2014108404 | 7/2014 |
| WO | 2014198905 | 12/2014 |
| WO | 2015082344 | 6/2015 |
| WO | 2015086257 | 6/2015 |
| WO | 2016026896 | 2/2016 |
| WO | 2017021504 | 2/2017 |
| WO | 2017064052 | 4/2017 |
| WO | 2017080698 | 5/2017 |
| WO | 2017148789 | 9/2017 |
| WO | 2018019594 | 2/2018 |
| WO | 2018033512 | 2/2018 |
| WO | 2018054819 | 3/2018 |
| WO | 2018141547 | 8/2018 |
| WO | 2019038369 | 2/2019 |
| WO | 2019038371 | 2/2019 |
| WO | 2019063778 | 4/2019 |
| WO | 2019103937 | 5/2019 |
| WO | 2019141452 | 7/2019 |
| WO | 2019141453 | 7/2019 |
| WO | 2019215148 | 11/2019 |
| WO | 2020006286 | 1/2020 |
| WO | 2020052862 | 3/2020 |
| WO | 2020148076 | 7/2020 |
| WO | 2020160993 | 8/2020 |
| WO | 2020193009 | 10/2020 |

OTHER PUBLICATIONS

International Search Report and Written Opinion issued with respect to application No. PCT/EP2021/063620.
Extended European Search Report issued with respect to application No. 20176506.2.
Taiwanese Office Action in counterpart Taiwanese Patent Application No. 110118794 dated Jan. 17, 2025 (and English language translation of Office Action), 7 pages.
Japanese Office Action in counterpart Japanese Patent Application No. 2022-571112 dated May 27, 2025 (and English language translation of Office Action).

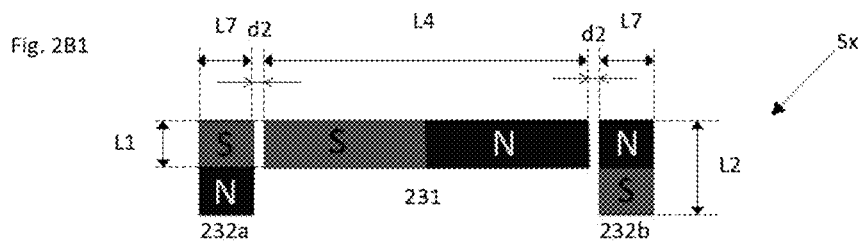
Fig. 2B1
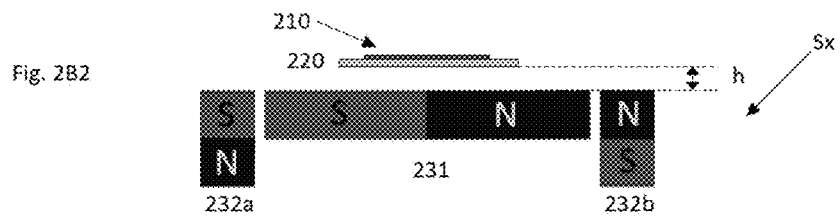
Fig. 2B2
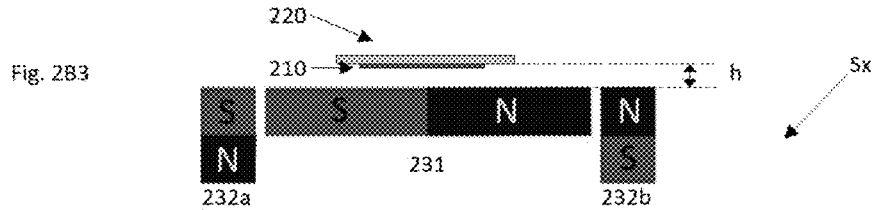
Fig. 2B3
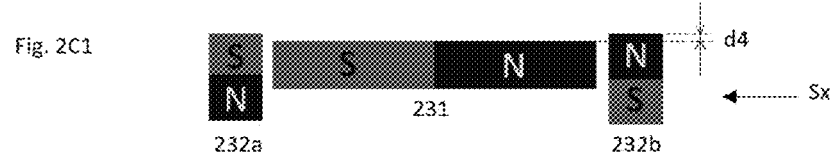
Fig. 2C1
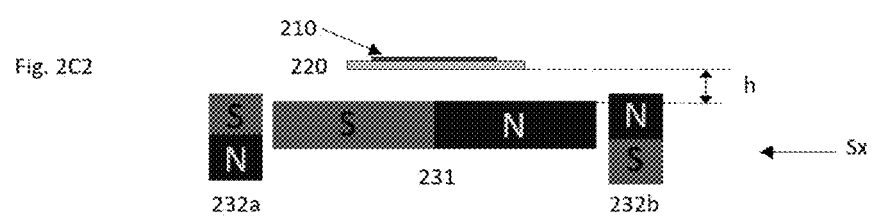
Fig. 2C2
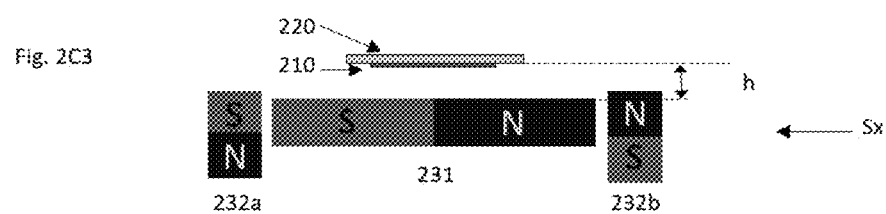
Fig. 2C3

Fig. 2D1
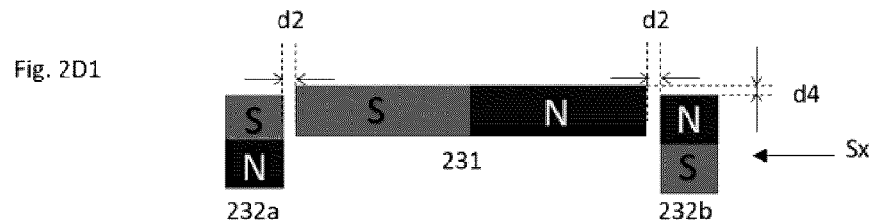
Fig. 2D2
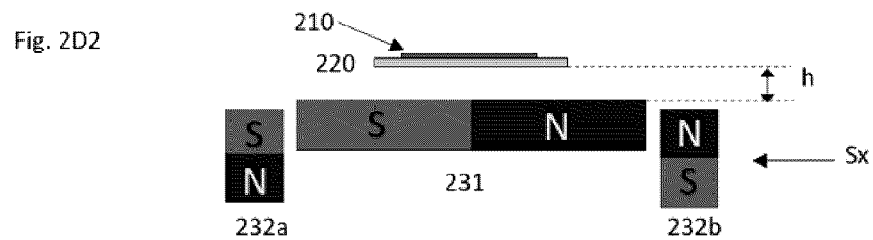
Fig. 2D3
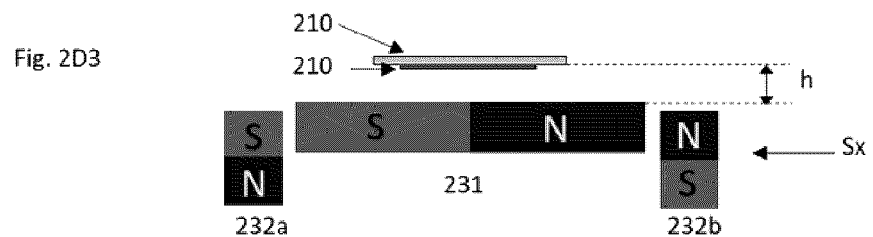
Fig. 3A
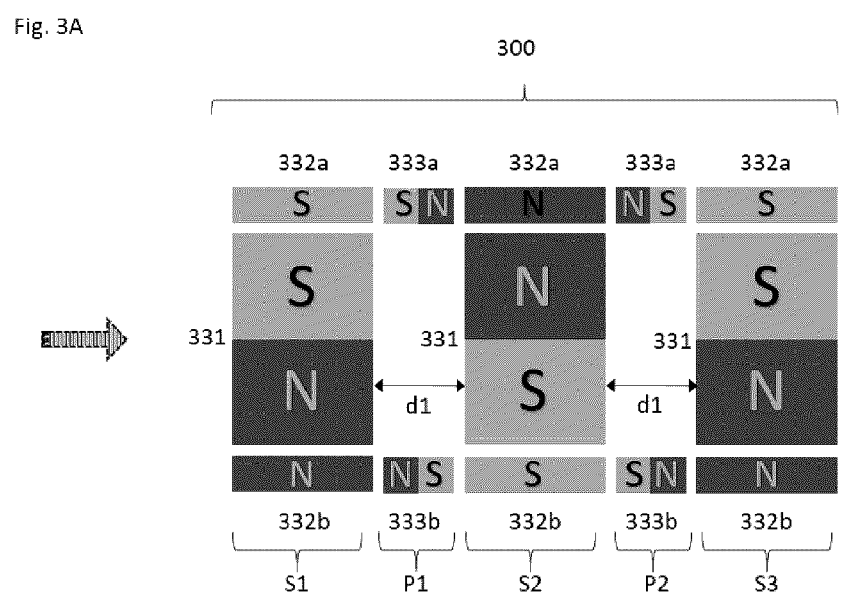

MAGNETIC ASSEMBLIES AND METHODS FOR PRODUCING OPTICAL EFFECT LAYERS COMPRISING ORIENTED PLATELET-SHAPED MAGNETIC OR MAGNETIZABLE PIGMENT PARTICLES

FIELD OF THE INVENTION

The present invention relates to the field of magnetic assemblies and methods for producing optical effect layers (OELs) comprising magnetically oriented platelet-shaped magnetic or magnetizable pigment particles. In particular, the present invention provides magnetic assemblies and methods for magnetically orienting platelet-shaped magnetic or magnetizable pigment particles in coating layers so as to produce OELs and the use of said OELs as anti-counterfeit means on security documents or security articles as well as decorative purposes.

BACKGROUND OF THE INVENTION

It is known in the art to use inks, compositions, coatings or layers containing oriented magnetic or magnetizable pigment particles, particularly also optically variable magnetic or magnetizable pigment particles, for the production of security elements, e.g. in the field of security documents. Coatings or layers comprising oriented magnetic or magnetizable pigment particles are disclosed for example in U.S. Pat. Nos. 2,570,856; 3,676,273; 3,791,864; 5,630,877 and 5,364,689. Coatings or layers comprising oriented magnetic color-shifting pigment particles, resulting in particularly appealing optical effects, useful for the protection of security documents, have been disclosed in WO 2002/090002 A2 and WO 2005/002866 A1.

Security features, e.g. for security documents, can generally be classified into "covert" security features on the one hand, and "overt" security features on the other hand. The protection provided by covert security features relies on the principle that such features are difficult to detect, typically requiring specialized equipment and knowledge for detection, whereas "overt" security features rely on the concept of being easily detectable with the unaided human senses, e.g. such features may be visible and/or detectable via the tactile sense while still being difficult to produce and/or to copy. However, the effectiveness of overt security features depends to a great extent on their easy recognition as a security feature.

Magnetic or magnetizable pigment particles in printing inks or coatings allow for the production of magnetically induced images, designs and/or patterns through the application of a correspondingly structured magnetic field, inducing a local orientation of the magnetic or magnetizable pigment particles in the not yet hardened (i.e. wet) coating, followed by the hardening of the coating. The result is a fixed and stable magnetically induced image, design or pattern. Materials and technologies for the orientation of magnetic or magnetizable pigment particles in coating compositions have been disclosed for example in U.S. Pat. Nos. 2,418,479; 2,570,856; 3,791,864, DE 2006848-A, U.S. Pat. Nos. 3,676,273, 5,364,689, 6,103,361, EP 0 406 667 B1; US 2002/0160194; US 2004/0009308; EP 0 710 508 A1; WO 2002/09002 A2; WO 2003/000801 A2; WO 2005/002866 A1; WO 2006/061301 A1. In such a way, magnetically induced patterns which are highly resistant to counterfeit can be produced. The security element in question can only be produced by having access to both, the magnetic or magnetizable pigment particles or the corresponding ink, and the particular technology employed to print said ink and to orient said pigment in the printed ink.

The methods and devices described hereabove use magnetic assemblies to mono-axially orient platelet-shaped magnetic pigment particles. Mono-axial orientation of magnetic pigment particles result in neighboring particles having their main axis parallel to each other and to the magnetic field, while their minor axis in the plane of the pigment particles is not, or much less constrained by the applied magnetic field.

With the aim of producing coatings or layers comprising bi-axially oriented magnetic or magnetizable pigment particles, methods for generating time-dependent, direction-variable magnetic fields have been developed, thus allowing the bi-axial orientation of magnetic or magnetizable pigment particles.

WO 2015/086257 A1 discloses a method for producing an optical effect layer (OEL) on a substrate, said process comprising two magnetic orientation steps, said steps consisting of i) exposing a coating composition comprising platelet-shaped magnetic or magnetisable pigment particles to a dynamic, i.e. direction changing, magnetic field of a first magnetic-field-generating device so as to bi-axially orient at least a part of the platelet-shaped magnetic or magnetisable pigment particles and ii) exposing the coating composition to a static magnetic field of a second magnetic-field-generating device, thereby mono-axially re-orienting at least a part of the platelet-shaped magnetic or magnetisable pigment particles according to a design transferred by said second magnetic-field-generating device.

EP 2 157 141 A1 discloses magnetic-field-generating devices comprising a linear arrangement of at least three magnets that are positioned in a staggered fashion or in zigzag formation, each of said three magnets having its magnetic axis substantially perpendicular to the substrate surface and said at least three magnets at the same side of a feedpath have the same polarity, which is opposed to the polarity of the magnet(s) on the opposing side of the feedpath in a staggered fashion. The arrangement of the at least three magnets provides a predetermined change of the field direction as platelet-shaped magnetic or magnetizable pigment particles in a coating composition move past the magnets (direction of movement depicted as an arrow). However, as known by the man skilled in the art, magnetic fields rapidly decrease with the distance between the magnets and the sample and therefore the feedpath of the magnetic-field-generating devices in EP 2 157 141 A1 are limited in width thus limiting the production of optical effect layers of large sizes. Furthermore, the process described in EP 2 157 141 A1 would require long feedpaths with the consequence of having a high number of magnets disposed in a staggered fashion, wherein said long feedpaths that are not compatible with the limited available space in industrial presses.

WO 2015/086257 A1, WO 2018/019594 A1 and EP 3 224 055 B1 disclose devices and processes for producing optical effect layers (OEL) comprising magnetically bi-axially oriented platelet-shaped magnetic or magnetizable pigment particles. The process discloses a step of exposing the pigment particles to a dynamic magnetic field of a magnetic assembly comprising a Halbach cylinder assembly, wherein said Halbach assembly is, respectively, a linear Halbach arrays disposed on one side of the substrate carrying the orientable pigment particles in WO 2015/086257 A1 and WO 2018/019594 A1 and an Halbach cylinder assembly in EP 3 224 055 B1. WO 2015/086257 A1 and WO 2018/019594 A1 may suffer from the same drawbacks as those described for EP 2 157 141 A1 and EP 3 224 055 B1 requires the curing of the layer to be carried out within the cylinder assembly thus rendering impossible a potential re-orientation step of the magnetic or magnetizable pigment particles.

US 2007/0172261 A1 discloses spinning magnets or magnetic assemblies generating radially symmetrical time-variable magnetic fields, wherein said magnets or magnetic assemblies are driven by a shaft (or spindle) connected to an external motor. CN 102529326 B discloses examples of devices comprising spinning magnets that might be suitable for bi-axially orienting platelet-shaped magnetic or magnetizable pigment particles. WO 2015/082344 A1, WO 2016/026896 A1 and WO 2018/141547 A1 disclose shaft-free spinning magnets or magnetic assemblies constrained in a housing made of non-magnetic and are driven by one or more magnet-wire coils wound around the housing. However, spinning magnets or magnetic assemblies may suffer from difficulties in their use or impossibility of their use on industrial printing presses such as those as disclosed e.g. in EP 1 648 702 B1 or EP 1 961 559 A1. Difficulties may include the need for important redesigns of existing industrial printing presses, including providing electric power and control signals to run the motors of the spinning magnets.

Therefore, a need remains for improved magnetic assemblies and methods for producing homogenous bi-axial magnetic orientation of platelet-shaped magnetic or magnetisable pigment particles comprised in coating layers to as to form optical effect layers (OELs), said methods being mechanically robust, easy to implement with an industrial high-speed printing equipment, in particular rotating magnetic cylinders, without resorting to cumbersome, tedious and expensive modifications of said equipment. In particular, there is a need of compact magnetic assemblies with a wide feedpath/useable working area and methods also suitable for orienting magnetic or magnetizable pigments particles over large printed areas as well as printed areas placed at a distance of up to 20 mm from said magnetic assemblies.

SUMMARY OF THE INVENTION

Accordingly, it is an object of the present invention to overcome the deficiencies of the prior art. This is achieved by the provision of a]
- magnetic assembly (x00) for producing an optical effect layer (OEL) on a substrate (x20), said magnetic assembly (x00) being configured for receiving the substrate (x20) in an orientation substantially parallel to a first plane and above the first plane, said the first plane being located above the upmost surface of the two second bar dipole magnets ($x32_a$ and $x32_b$) and further comprising:
  a) at least a first set (S1) and a second set (S2), each of the first and second sets (S1, S2) comprising:
    i) one first bar dipole magnet (x31)
      having a first thickness (L1), a first length (L4) and a first width (L5), and
      having its magnetic axis oriented to be substantially parallel to the first plane,
    ii) two second bar dipole magnets ($x32_a$ and $x32_b$)
      having a second thickness (L2), a second length (L6) and a second width (L7),
      the two second bar dipole magnets ($x32_a$, $x32_b$) having their upmost surfaces flush with each other, and
      having their magnetic axes oriented to be substantially perpendicular to the first plane,
    the first bar dipole magnet (x31) of the first set (S1) having a magnetic direction opposite to the magnetic direction of the first bar dipole magnet (x31) of the second set (S2),
    the first bar dipole magnets (x31) of the first and second sets (S1, S2) being spaced apart by a first distance (d1),
    the first bar dipole magnet (x31) of the first set (S1) having substantially the same first length (L4) and first width (L5) as the first bar dipole magnet (x31) of the second set (S2), and
    the two second bar dipole magnets ($x32_a$ and $x32_b$) of the first set (S1) having substantially the same second lengths (L6) and second widths (L7) as the two second bar dipole magnets ($x32_a$ and $x32_b$) of the second set (S2),
    the first bar dipole magnet (x31) and the second bar dipole magnets ($x32_a$ and $x32_b$) of each of the first and second sets (S1, S2) being aligned to form a column, in that the first bar dipole magnet (x31) of the first and second sets (S1, S2) is respectively placed between and spaced apart from the second bar dipole magnets ($x32_a$ and $x32_b$) by a second distance (d2),
    the first width (L5) and the second length (L6) being substantially the same,
    the North pole of one second bar dipole magnet ($x32_a$ and $x32_b$) of each of the first and second sets (S1, S2) pointing towards the first plane as the North Pole of the first bar dipole magnet (x31) pointing towards said one, and the South pole of the other of the second bar dipole magnet ($x32_a$ and $x32_b$) of each of the first and second sets (S1, S2) pointing towards the first plane and the South Pole of the first bar dipole magnet (x31) pointing towards said other, and further comprising:
  b) a first pair (P1) of third bar dipole magnets ($x33_a$ and $x33_b$)
    having a third thickness (L3), a third length (L8) and a third width (L9) and
    having their magnetic axes oriented to be substantially parallel to the first plane,
    the second width (L7) of the two second bar dipole magnets ($x32_a$ and $x32_b$) of the first and second sets (S1, S2) having substantially the same value as the third width (L9) of the third bar dipole magnets ($x33_a$ and $x33_b$),
    each of the third bar dipole magnets ($x33_a$ and $x33_b$) being aligned with one second bar dipole magnet ($x32_a$ and $x32_b$) of the first set (S1) and one second bar dipole magnet ($x32_a$ and $x32_b$) of the second set (S2) so as to form two lines, the third bar dipole magnets ($x33_a$ and $x33_b$) being placed between and spaced apart from the respective second bar dipole magnets ($x32_a$ and $x32_b$) by a third distance (d3),
    the North poles of the third bar dipole magnets ($x33_a$ and $x33_b$) respectively pointing towards one of the second bar dipole magnets ($x32_a$ and $x32_b$) and the North Poles of said ones of the second bar dipole magnets ($x32_a$ and $x32_b$) pointing towards the first plane or the South poles of the third bar dipole magnets ($x33_a$ and $x33_b$) respectively pointing towards one of the second bar dipole magnets ($x32_a$ and $x32_b$) and the South Poles of said ones of the second bar dipole magnets ($x32_a$ and $x32_b$) pointing towards the first plane, wherein the first bar dipole magnets (x31) of the first and second sets (S1, S2), the second bar dipole magnets (x32$_a$ and x32$_b$) of the first and second sets (S1, S2), and the third bar dipole magnets (x33$_a$ and x33$_b$) are at least partially embedded in a non-magnetic supporting matrix.

Also described herein are uses of the magnetic assembly (x00) described herein for producing the optical effect layer (OEL) on the substrate (x20) described herein.

Also described herein are printing apparatuses comprising the magnetic assembly (x00 described herein being mounted in the vicinity of a transferring device preferably selected from the group consisting of chains, belts, cylinders and combinations thereof.

Also described herein are methods for producing the optical effect layer (OEL) described herein on the substrate (x20) described herein and optical effect layers (OELs) obtained thereof, said methods comprising the steps of:

i) applying on a substrate (x20) surface a radiation curable coating composition comprising platelet-shaped magnetic or magnetisable pigment particles, wherein an X-axis and a Y-axis define a plane of predominant extension of the particles, said radiation curable coating composition being in a first, liquid state so as to form a coating layer (x10);

ii) exposing the coating layer (x10) to a magnetic field of the magnetic assembly (x00) described herein so as to bi-axially orient at least a part of the platelet-shaped magnetic or magnetisable pigment particles;

iii) at least partially curing the radiation curable coating composition of step ii) to a second, solid state so as to fix the platelet-shaped magnetic or magnetisable pigment particles in their adopted positions and orientations.

Also described herein optical effect layers (OELs) obtained by the methods described herein and/or by using the printing apparatuses described herein as well as their uses as anti-counterfeit means on documents and articles (in other words for protecting and authenticating documents and articles) as well as for decorative purposes.

The magnetic assemblies and methods provided by the present invention are mechanically robust, easy to implement with an industrial high-speed printing equipment, without resorting to cumbersome, tedious and expensive modifications of said equipment. Furthermore, the magnetic assemblies and methods of the present invention allows to bi-axially orient platelet-shaped magnetic or magnetisable pigment particles in a homogeneous manner and also suitable to produce optical effect layers over large printed areas as well as printed areas placed at a distance of up to 20 mm from said magnetic assemblies.

BRIEF DESCRIPTION OF DRAWINGS

The magnetic assemblies (x00) and the methods described herein for producing optical effect layers (OEL) on the substrate (x20) described herein are now described in more details with reference to the drawings and to particular embodiments, wherein FIG. 1 schematically illustrates a platelet-shaped pigment particle.

FIG. 2B1-3 schematically illustrate cross-sections of a set (Sx) comprising a first bar dipole magnets (231) and two second bar dipole magnets (232$_a$ and 232$_b$), wherein the upmost surface of the first bar dipole magnets (231) is flush with the upmost surface of the two second bar dipole magnets (232$_a$ and 232$_b$), wherein FIG. 2B2 illustrates a method wherein the substrate (220) faces the set (Sx) and FIG. 2B3 illustrates a method wherein the coating layer (210) comprising the platelet-shaped magnetic or magnetizable pigment particles faces the set (Sx).

FIGS. 2C1-3 and 2D1-3 schematically illustrate cross-sections of a set (Sx) comprising a first bar dipole magnets (231) and two second bar dipole magnets (232$_a$ and 232$_b$), wherein the upmost surface of the first bar dipole magnets (231) is not flush with the upmost surface of the two second bar dipole magnets (232$_a$ and 232$_b$) and wherein a fourth distance (d4) is present between the upmost surface of the first bar dipole magnets (231) and the upmost surface of the two second bar dipole magnets (232$_a$ and 232$_b$).

FIGS. 2C2 and 2D2 illustrate methods wherein the substrate (220) faces the set (Sx) and FIGS. 2C3 and 2D3 illustrate methods wherein the coating layer (210) comprising the platelet-shaped magnetic or magnetizable pigment particles faces the set (Sx) of the magnetic assembly.

FIG. 3A schematically illustrates a top view of a magnetic assembly (300) comprising a first set (S1) comprising a first bar dipole magnets (331) and two second bar dipole magnets (332$_a$ and 332$_b$), a second set (S2) comprising a first bar dipole magnets (331) and two second bar dipole magnets (332$_a$ and 332$_b$), a third set (S3) comprising a first bar dipole magnets (331) and two second bar dipole magnets (332$_a$ and 332$_b$), a first pair (P1) of third bar dipole magnets (333$_a$ and 333$_b$) and a second pair (P2) of third bar dipole magnets (333$_a$ and 333$_b$).

As shown in FIG. 5A-C, an optional step (depicted with a selective curing unit (580) in brackets) of selectively at least partially curing one or more first areas of the coating layer of step ii) so as to fix at least a part of the non-spherical magnetic or magnetizable particles in their adopted positions and orientations such that one or more second areas of the coating layer are not exposed to irradiation, may be carried out prior to the step of exposing the coating layer to the magnetic field of the one or more magnets (M1) so as to re-orient at least a part of the platelet-shaped magnetic or magnetisable particles in the one or more second areas.

As shown in FIG. 5E, an optional step (depicted with a selective curing unit (580) in brackets) of selectively at least partially curing one or more first areas of the coating layer of step ii) so as to fix at least a part of the non-spherical magnetic or magnetizable particles in their adopted positions and orientations such that one or more second areas of the coating layer are not exposed to irradiation, may be carried out prior to the single step of exposing the radiation curable coating composition to the interaction of the magnetic fields of the magnetic assembly (500*b*) and of the magnetic-field-generating device so as to re-orient at least a part of the platelet-shaped magnetic or magnetisable particles in the one or more second areas.

Figure 1:
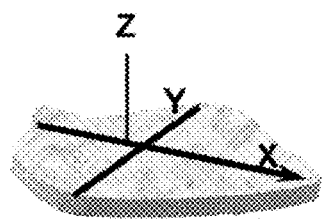

described herein and of a first magnetic-field-generating device comprising one or more hard magnetic magnets (M1a) or comprising one or more soft magnetic plates (M1a) carrying one or more indicia in the form of voids and/or indentations and/or protrusions, said one or more hard magnetic magnets or soft magnetic plates (M1a) being mounted on a rotating magnetic cylinder (560a); a step iii) (depicted with a selective curing unit (580)) of selectively at least partially curing one or more first areas of the coating layer of step ii) so as to fix at least a part of the non-spherical magnetic or magnetizable particles in their adopted positions and orientations such that one or more second areas of the coating layer are not exposed to irradiation; a step iv) of exposing the coating layer to the magnetic field of a third magnetic assembly (500c) described herein so as to biaxially re-orient the non-spherical magnetic or magnetizable particles comprised in the one or more second (not yet cured) areas of the coating layer; a step v) exposing, in a single step, the radiation curable coating composition to the interaction of the magnetic fields of a fourth magnetic assembly (500d) described herein and of a second magnetic-field-generating device comprising one or more hard magnetic magnets (M1b) or comprising one or more soft magnetic plates (M1b) carrying one or more indicia in the form of voids and/or indentations and/or protrusions, said one or more hard magnetic magnets or soft magnetic plates (M1b) being mounted on a rotating magnetic cylinder (560) and a step vi) of at least partially curing the radiation curable coating composition with a curing unit (550).

Figure 6A:
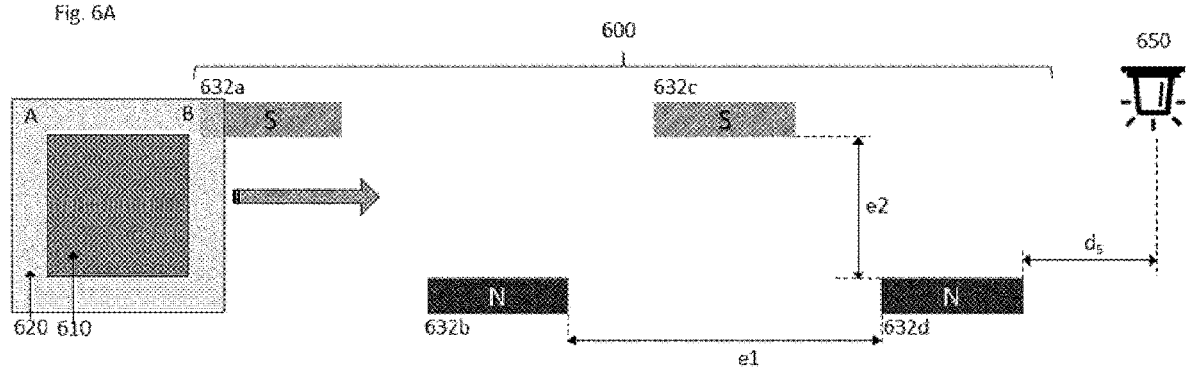
Figure 6B:
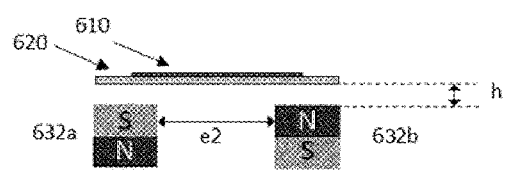

FIG. 6A-B schematically illustrate a comparative method for producing an optical effect layer (OEL) on a substrate (620).

Figure 7A:
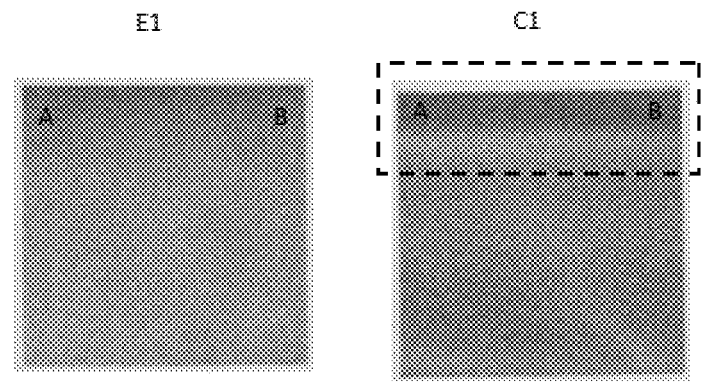
Figure 7B:
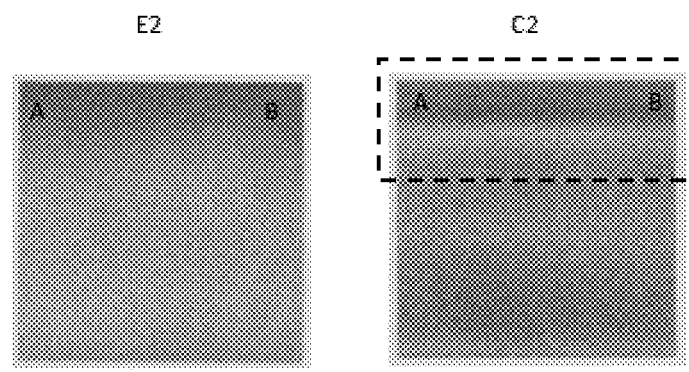
Figure 7C:
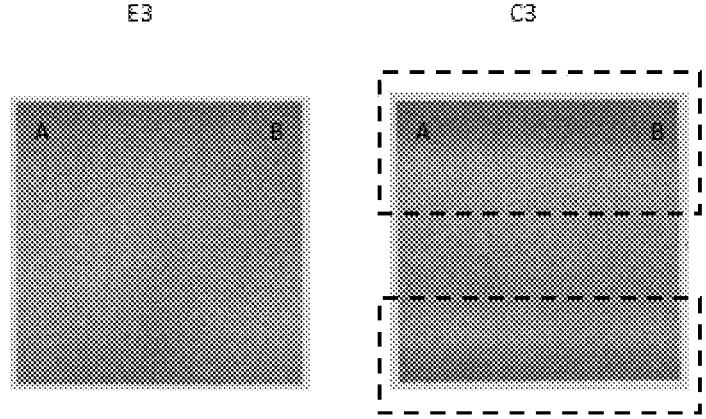

FIG. 7A-C shows pictures of OELs prepared with the method according to the present invention (E1, E2 and E3, left) and prepared according to a comparative method (C1, C2 and C3, right).

DETAILED DESCRIPTION

Definitions

The following definitions are to be used to interpret the meaning of the terms discussed in the description and recited in the claims.

As used herein, the term "at least" is meant to define one or more than one, for example one or two or three.

As used herein, the terms "about" and "substantially" mean that the amount or value in question may be the specific value designated or some other value in its neighborhood. Generally, the terms "about" and "substantially" denoting a certain value is intended to denote a range within ±5% of the value. As one example, the phrase "about 100" denotes a range of 100±5, i.e. the range from 95 to 105. Generally, when the terms "about" and "substantially" str used, it can be expected that similar results or effects according to the invention can be obtained within a range of ±5% of the indicated value.

The terms "substantially parallel" refer to deviating not more than 10° from parallel alignment and the terms "substantially perpendicular" refer to deviating not more than 10° from perpendicular alignment.

As used herein, the term "and/or" means that either all or only one of the elements of said group may be present. For example, "A and/or B" shall mean "only A, or only B, or both A and B". In the case of "only A", the term also covers the possibility that B is absent, i.e. "only A, but not B".

The term "comprising" as used herein is intended to be non-exclusive and open-ended. Thus, for instance a coating composition comprising a compound A may include other compounds besides A. However, the term "comprising" also covers, as a particular embodiment thereof, the more restrictive meanings of "consisting essentially of" and "consisting of", so that for instance "a fountain solution comprising A, B and optionally C" may also (essentially) consist of A and B, or (essentially) consist of A, B and C.

The term "optical effect layer (OEL)" as used herein denotes a coating layer that comprises oriented platelet-shaped magnetic or magnetizable pigment particles and a binder, wherein said platelet-shaped magnetic or magnetizable pigment particles are oriented by a magnetic field and wherein the oriented platelet-shaped magnetic or magnetizable pigment particles are fixed/frozen in their orientation and position (i.e. after hardening/curing) so as to form a magnetically induced image.

The term "coating composition" refers to any composition which is capable of forming an optical effect layer (OEL) on a solid substrate and which can be applied preferably but not exclusively by a printing method. The coating composition comprises the platelet-shaped magnetic or magnetizable pigment particles described herein and the binder described herein.

As used herein, the term "wet" refers to a coating layer which is not yet cured, for example a coating in which the platelet-shaped magnetic or magnetizable pigment particles are still able to change their positions and orientations under the influence of external forces acting upon them.

As used herein, the term "indicia" shall mean discontinuous layers such as patterns, including without limitation symbols, alphanumeric symbols, motifs, letters, words, numbers, logos and drawings.

The term "hardening" is used to denote a process wherein the viscosity of a coating composition in a first physical state which is not yet hardened (i.e. wet) is increased so as to convert it into a second physical state, i.e. a hardened or solid state, where the platelet-shaped magnetic or magnetizable pigment particles are fixed/frozen in their current positions and orientations and can no longer move nor rotate.

The term "security document" refers to a document which is usually protected against counterfeit or fraud by at least one security feature. Examples of security documents include without limitation value documents and value commercial goods.

The term "security feature" is used to denote an image, pattern or graphic element that can be used for authentication purposes.

Where the present description refers to "preferred" embodiments/features, combinations of these "preferred" embodiments/features shall also be deemed as disclosed as long as this combination of "preferred" embodiments/features is technically meaningful.

In the context of the present text, the term "plane" covers not only flat planes, but also curved planes such as the circumferential surface of a cylinder. In this respect a "plane" which is oriented so as to be "parallel" to a curved plane is also curved so that the local tangents to the two planes are parallel to each other. Similarly, a direction which is oriented so as to be perpendicular to a curved plane is perpendicular to the tangents to the plane in the point where it would cross the plane.

In other words, if a substrate is in an orientation substantially parallel to a curved first plane and above the first plane, it is formed so that the local tangents to the substrate in a first point thereof are parallel to the local tangents to the curved first plane in a second point thereof, wherein the first and second points are relatively positioned with respect to each other along a direction perpendicular to the local tangents in the first and second points.

The present invention provides magnetic assemblies (x00) suitable for producing optical effect layers (OELs) on substrates (x20), wherein said OELs are based on magnetically oriented platelet-shaped magnetic or magnetizable pigment particles. In contrast to needle-shaped pigment particles which can be considered as one-dimensional particles, platelet-shaped pigment particles have an X-axis and a Y-axis defining a plane of predominant extension of the particles. In other words, platelet-shaped pigment particles may be considered to be two-dimensional particles due to the large aspect ratio of their dimensions as can be seen in FIG. 1. As shown in FIG. 1, a platelet-shaped pigment particle can be considered as a two-dimensional structure wherein the dimensions X and Y are substantially larger than dimension Z. Platelet-shaped pigment particles are also referred in the art as oblate particles or flakes. Such pigment particles may be described with a main axis X corresponding to the longest dimension crossing the pigment particle and a second axis Y perpendicular to X which also lies within said pigment particles.

In contrast to a mono-axial orientation wherein platelet-shaped magnetic or magnetizable pigment particles are oriented in such a way that only their main axis is constrained by the magnetic field, carrying out a bi-axial orientation means that the platelet-shaped magnetic or magnetisable pigment particles are made to orient in such a way that their two main axes are constrained. That is, each platelet-shaped magnetic or magnetisable pigment particle can be considered to have a major axis in the plane of the pigment particle and an orthogonal minor axis in the plane of the pigment particle. The major and minor axes of the platelet-shaped magnetic or magnetisable pigment particles are each caused to orient according to the magnetic field. Effectively, this results in neighboring platelet-shaped magnetic pigment particles that are close to each other in space to be essentially parallel to each other. Put another way, bi-axial orientation aligns the planes of the platelet-shaped magnetic or magnetisable pigment particles so that the planes of said pigment particles are oriented to be essentially parallel relative to the planes of neighboring (in all directions) platelet-shaped magnetic or magnetisable pigment particles. The magnetic assemblies (x00) described herein allow to bi-axially orient the platelet-shaped magnetic or magnetizable pigment particles described herein. By exposing the platelet-shaped magnetic or magnetizable pigment particles solely to the magnetic assemblies (x00) described herein (i.e. no simultaneous exposure to an additional magnetic field-generating device and/or no re-orientation step), the platelet-shaped magnetic or magnetizable pigment particles form a sheet-like structure with their X and Y axes substantially parallel to the substrate (x20) surface and are planarized in said two dimensions.

The magnetic assemblies (x00) described herein are configured for receiving the substrate (x20) described herein in an orientation substantially parallel to a first plane and substantially parallel to the substrate (x20) during the methods for producing the optical effect layers (OELs) described herein. The first plan described herein is substantially parallel to the substrate (x20) during the method described herein and is the first plane being located above the upmost surface of the two second bar dipole magnets (x32$_a$ and x32$_b$) (as shown in the figures.

The magnetic assemblies (x00) described herein comprise a) at least the first set (S1) and the second set (S2), each set (S1, S2) comprising the first bar dipole magnets (x31) and the second bar dipole magnets (x32$_a$ and x32$_b$) described herein and b) the first pair (P1) of third bar dipole magnets (x33$_a$ and x33$_b$) described herein, wherein the first bar dipole magnets (x31) of the first and second sets (S1, S2), the second bar dipole magnets (x32$_a$ and x32$_b$) of the first and second sets (S1, S2), and the third bar dipole magnets (x33$_a$ and x33$_b$) are at least partially embedded in the non-magnetic supporting matrix described herein.

Figure 2A:
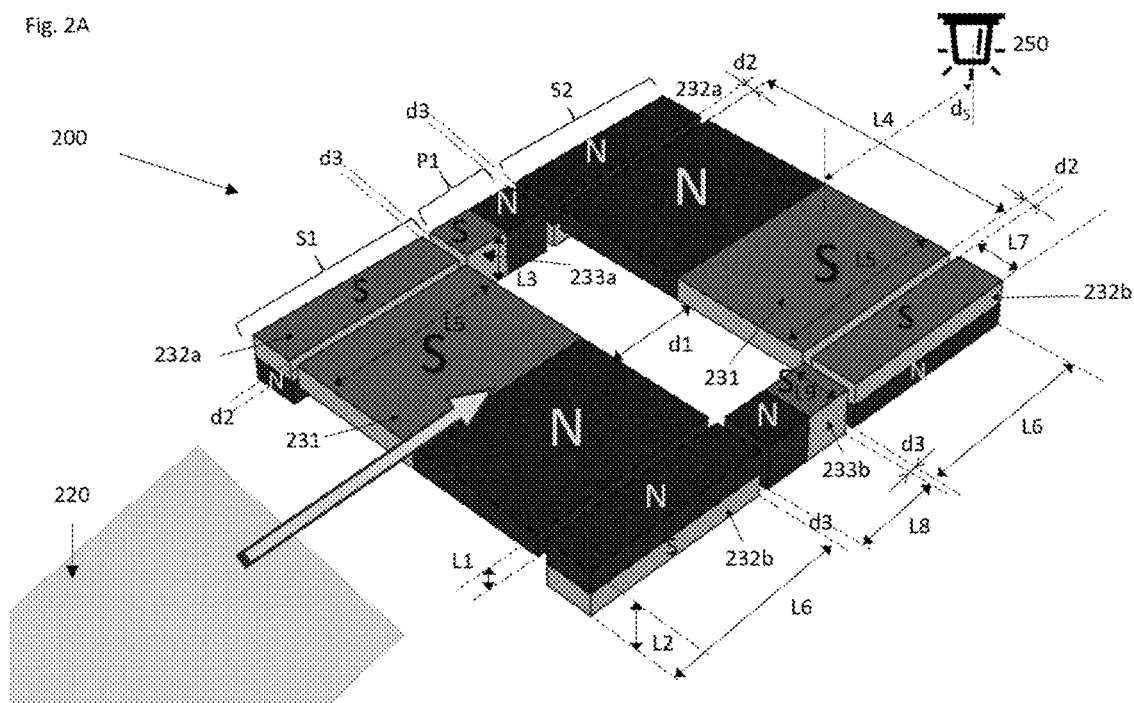
FIG. 2A schematically illustrates a method for producing an optical effect layer (OEL) on a substrate (220) according to the present invention, wherein a coating layer (not shown in FIG. 2A) comprising platelet-shaped pigment particles moves (see the arrow) in the vicinity and on top of the magnetic assembly (200) so as to be exposed to the magnetic field of said magnetic assembly (200) and then at least partially cured with a curing unit (250). The magnetic assembly (200) comprises a first set (S1) comprising a first bar dipole magnets (231) and two second bar dipole magnets (232$_a$ and 232$_b$), a second set (S2) comprising a first bar dipole magnets (231) and two second bar dipole magnets (232$_a$ and 232$_b$) and a first pair (P1) of third bar dipole magnets (233$_a$ and 233$_b$).

As shown for example in FIG. 2A, each of the first and second sets (S1, S2) comprises i) the first bar dipole magnet (x31) described herein and the two second bar dipole magnets (x32$_a$ and x32$_b$) described herein. The bar dipole magnets (x31) of the first and second sets (S1, S2) have a first thickness (L1), a first length (L4) and a first width (L5) and have their magnetic axes oriented to be substantially parallel to the first plane, substantially parallel to the length (L4) (and substantially parallel to the substrate (x20) during the method described herein). The first bar dipole magnets (x31) of the first and second sets (S1, S2) have substantially the same first length (L4) and first width (L5). The first bar dipole magnets (x31) of the first and second sets (S1, S2) preferably have substantially the same first thickness (L1) as the first bar dipole magnet (x31) of the second set (S2). The first bar dipole magnets (x31) of the first and second sets (S1, S2) are spaced apart by a first distance (d1). The first distance (d1) between the first bar dipole magnets (x31) of the first and second sets (S1, S2) is preferably is preferably greater than or equal to 15% of the first length (L4) and smaller than or equal to 150% of the first length (L4) (i.e. $0.15*L4 \leq d1 \leq 1.5*L4$), more preferably greater than or equal to 25% of the first length (L4) and smaller than or equal to 120% of the first length (L4) (i.e. $0.25*L4 \leq d1 \leq 1.2*L4$), even more preferably greater than or equal to 25% of the first length (L4) and smaller than or equal to 80% of the first length (L4) (i.e. $0.25*L4 \leq d1 \leq 0.8*L4$).

The first bar dipole magnet (x31) of the first set (S1) has a magnetic direction opposite to the magnetic direction of the first bar dipole magnet (x31) of the second set (S2).

The first bar dipole magnets (x31) of the first set (S1) and of the second set (S2) may be single pieces or may be formed by two or more adjacent bar dipole magnets (x31$_i$) having a first width (L5), a first thickness (L1), wherein the first length (L4) described herein is the sum of all said two or more adjacent bar dipole magnets (x31$_i$).

The two second bar dipole magnets (x32$_a$ and x32$_b$) of the first and second sets (S1, S2) have a second thickness (L2), a second length (L6) and a second width (L7) and have their upmost surfaces flush with each other. The two second bar dipole magnets (x32$_a$ and x32$_b$) of the first and second sets (S1, S2) have their magnetic axes oriented to be substantially perpendicular to the first plane, substantially parallel to their thickness (L2) (and substantially perpendicular to the substrate (x20) during the method described herein). The two second bar dipole magnets (x32$_a$ and x32$_b$) of the first and second sets (S1, S2) have substantially the same second lengths (L6) and have substantially the same second widths (L7). The two second bar dipole magnets (x32$_a$ and x32$_b$) of the first set (S1) preferably have substantially the same second thickness (L2) as the two second bar dipole magnets (x32$_a$ and x32$_b$) of the second set (S2).

For each set of the first and second sets (S1, S2), the first bar dipole magnet (x31) and the second bar dipole magnets (x32$_a$ and x32$_b$) are aligned to form a column, in that the first bar dipole magnet (x31) of each of the first and second sets (S1, S2) is respectively placed between and spaced apart from the second bar dipole magnets (x32$_a$ and x32$_b$) by a second distance (d2), said second distance (d2) being substantially the same for the first and second sets (S1, S2).

For each set (S1, S2), the North pole of one of the second bar dipole magnets (x32$_a$, x32$_b$) points towards the first plane (and points towards the substrate (x20) during the method described herein) when the North Pole of the first bar dipole magnet (x31) points towards that second bar dipole magnet (x32$_a$, x32$_b$), and the South pole of the other of the second bar dipole magnets (x32$_a$, x32$_b$) points towards the first plane (and points towards the substrate (x20) during the method described herein) when the South Pole of the first bar dipole magnet (x31) points towards that second bar dipole magnet (x32$_a$, x32$_b$).

As shown for example in FIG. 2A, the first pair (P1) described herein comprises the third bar dipole magnets (x33$_a$ and x33$_b$) described herein, wherein said third bar dipole magnets (x33$_a$ and x33$_b$) have a third thickness (L3), a third length (L8) and a third width (L9) and have their magnetic axes oriented to be substantially parallel to the first plane (and substantially parallel to the substrate (x20) during the method described herein).

The second widths (L7) of the two second bar dipole magnets (x32$_a$ and x32$_b$) of the first and second sets (S1, S2) have substantially the same value as the third width (L9) of the third bar dipole magnets (x33$_a$ and x33$_b$).

Each of the third bar dipole magnets (x33$_a$ and x33$_b$) is aligned with one second bar dipole magnet (x32$_a$ and x32$_b$) of the first set (S1) and one second bar dipole magnet (x32$_a$ and x32$_b$) of the second set (S2) so as to form two lines, the third bar dipole magnets (x33$_a$ and x33$_b$) being placed between and spaced apart from the respective second bar dipole magnets (x32$_a$ and x32$_b$) by a third distance (d3), said third distance (d3) being substantially the same for the two lines.

The North poles of the third bar dipole magnets (x33$_a$ and x33$_b$) respectively point towards one of the second bar dipole magnets (x32$_a$ and x32$_b$) and the North Poles of said ones of the second bar dipole magnets (x32$_a$ and x32$_b$) point towards the first plane (and point towards the substrate (x20) during the method described herein); or the South poles of the third bar dipole magnets (x33$_a$ and x33$_b$) respectively point towards one of the second bar dipole magnets (x32$_a$ and x32$_b$) and the South Poles of said ones of the second bar dipole magnets (x32$_a$ and x32$_b$) point towards the first plane (and point towards the substrate (x20) during the method described herein).

Figure 3B:
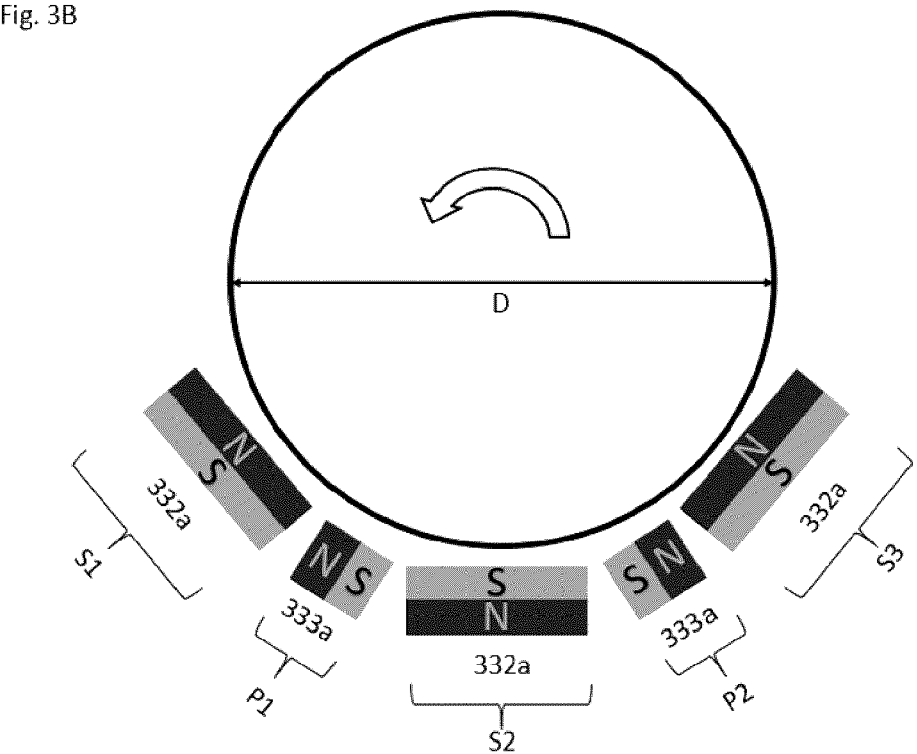
FIG. 3B schematically illustrates a cross-section of the magnetic assembly (300) of FIG. 3A in the vicinity of a cylinder, wherein the magnetic assembly (300) has been bent to match the curvature of the cylinder.
Figure 3C:
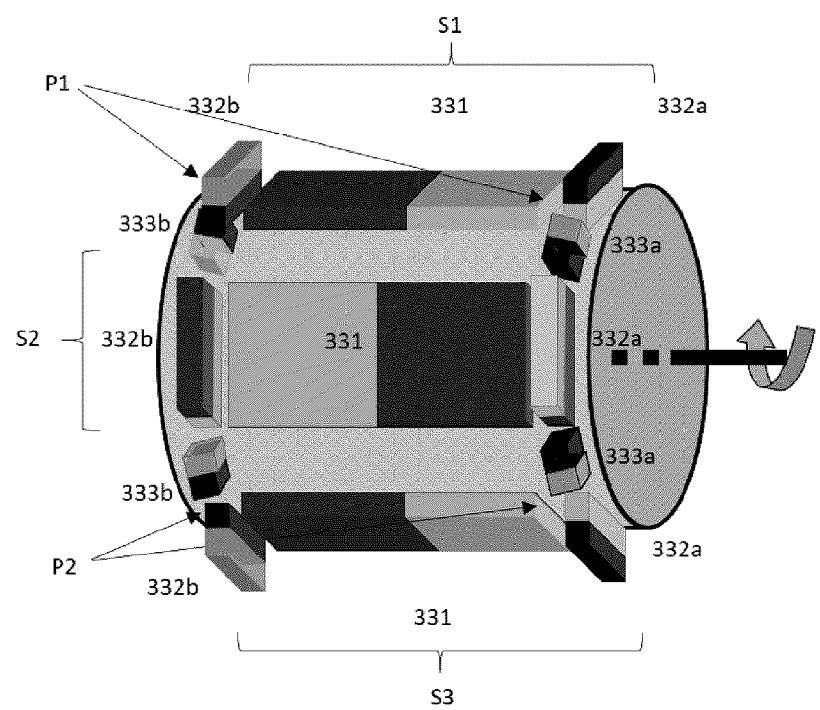
FIG. 3C schematically illustrates a view of the magnetic assembly (300) of FIG. 3A-B in the vicinity of a cylinder, wherein the magnetic assembly (300) has been bent to match the curvature of the cylinder.
Figure 4:
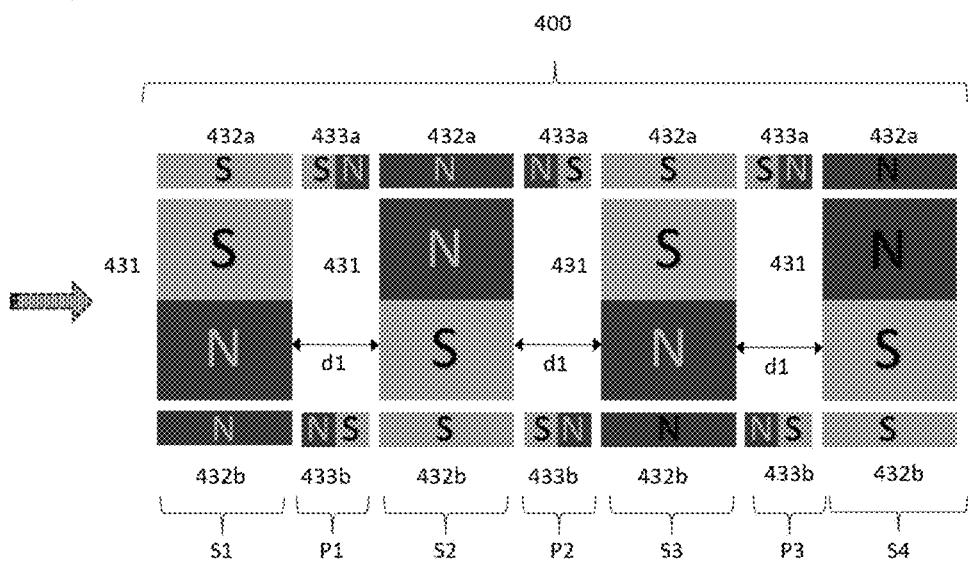
FIG. 4 schematically illustrates a top view of a magnetic assembly (400) comprising a first set (S1) comprising a first bar dipole magnets (431) and two second bar dipole magnets (432$_a$ and 432$_b$), a second set (S2) comprising a first bar dipole magnets (431) and two second bar dipole magnets (432$_a$ and 432$_b$), a third set (S3) comprising a first bar dipole magnets (431) and two second bar dipole magnets (432$_a$ and 432$_b$), a fourth set (S4) comprising a first bar dipole magnets (431) and two second bar dipole magnets (432$_a$ and 432$_b$), a first pair (P1) of third bar dipole magnets (433$_a$ and 433$_b$), a second pair (P2) of third bar dipole magnets (433$_a$ and 433$_b$) and a third pair (P3) of third bar dipole magnets (433$_a$ and 433$_b$).

According to a preferred embodiment shown for example in FIGS. 2A, 3 and 4, the magnetic assembly (x00) described herein is rectangular shaped, in particular square shaped, when observed from a top view. The rectangular shaped, in particular square shaped, magnetic assembly (x00) is thus delimited by the two columns formed by the first and second sets (S1, S2) and the two lines in FIG. 2A; or by the two columns of the first and third set (S1, S3) and the two lines in FIG. 3; or by the two columns of the first and fourth sets (S1, S4) and the two lines in FIG. 4.

The first thickness (L1) of the first bar dipole magnets (x31) of the first and second sets (S1, S2) is preferably equal to or smaller than the second thickness (L2) of the second bar dipole magnets (x32$_a$ and x32$_b$) of the first and second sets (S1, S2). More preferably, the ratio of the second thickness (L2) of the second bar dipole magnets (x32$_a$ and x32$_b$) of the first and second sets (S1, S2) over the first thickness (L1) of the first bar dipole magnets (x31) of the first and second sets (S1, S2) (L2/L1) is equal to or smaller than 3 and greater than or equal to 1 (i.e. $1 \leq L2/L1 \leq 3$), even more preferably equal to or smaller than 2.5 and greater than or equal to 1.5 (i.e. $1.5 \leq L2/L1 \leq 2.5$).

The first thickness (L1) of the first bar dipole magnets (x31) of the first and second sets (S1, S2) is preferably equal to or smaller than the third thickness (L3) of the third bar dipole magnets (x33$_a$ and x33$_b$) of the first pair (P1). More preferably, the ratio of the third thickness (L3) of the third bar dipole magnets (x33$_a$ and x33$_b$) of the first pair (P1) over the first thickness (L1) of the first bar dipole magnets (x31) of the first and second sets (S1, S2) (L3/L1) is equal to or smaller than 3 and greater than or equal to 1 (i.e. $1 \leq L3/L1 \leq 3$), even more preferably equal to or smaller than 2.5 and greater than or equal to 1.5 (i.e. $1.5 \leq L3/L1 \leq 2.5$).

The second distance (d2) between the first bar dipole magnet (x31) and the second bar dipole magnets (x32$_a$ and x32$_b$) is larger than or equal to 0 and smaller than or equal to % of the first thickness (L1) of the first bar dipole magnets (x31) (i.e. $0 \leq d2 \leq \frac{1}{2}L1$).

The third distance (d3) between the third bar dipole magnets (x33$_a$ and x33$_b$) of the first pair (P1) and the second bar dipole magnets (x32$_a$ and x32$_b$) of the first and second sets (S1, S2) is larger than or equal to 0 and smaller than or equal to the % of the first thickness (L1) of the first bar dipole magnets (x31) (i.e. $0 \leq d3 \leq \frac{1}{2}L1$).

As shown in FIG. 2A, the first distance (d1) between the first bar dipole magnets (x31) of the first and second sets (S1, S2) consists of the sum of the third length (L8) of one of the third bar dipole magnets (x33$_a$ and x33$_b$) and the two third distances (d3) between the third bar dipole magnets (x33$_a$ and x33$_b$) and the second bar dipole magnets (x32$_a$ and x32$_b$).

According to one embodiment shown for example in FIGS. 2A and 2B1-B3, the upmost surface of the first bar dipole magnets (x31) of the first and second sets (S1, S2) is flush with the upmost surface of the second bar dipole magnets (x32$_a$ and x32$_b$) of the first and second sets (S1, S2). The upmost surface of the first bar dipole magnets (x31) of the first and second sets (S1, S2) is preferably flush with the upmost surface of the second bar dipole magnets (x32$_a$ and x32$_b$) of the first and second sets (S1, S2) and also flush with the upmost surface of the third bar dipole magnets (x33$_a$ and x33$_b$).

According to another embodiment shown for example in FIG. 2C1-2D3, the upmost surface of the first bar dipole magnets (x31) of the first and second sets (S1, S2) is not flush with the upmost surface of the second bar dipole magnets (x32$_a$ and x32$_b$) of the first and second sets (S1, S2) and there is a fourth distance (d4) between the upmost surface of the first bar dipole magnets (x31) of the first and second sets (S1, S2) and the second bar dipole magnets (x32$_a$ and x32$_b$) of the first and second sets (S1, S2). According to this embodiment, the absolute value of the fourth distance (d4) between the upmost surface of the first bar dipole magnets (x31) of the first and second sets (S1, S2) and the second bar dipole magnets (x32$_a$ and x32$_b$) of the first and second sets (S1, S2) is larger than 0 and smaller than or equal to half of the first thickness (L1) of the first bar dipole magnets (x31) (i.e. $0 < |d4| \leq \frac{1}{2}L1$).

According to one embodiment, the magnetic assemblies (x00) may further comprise one or more combinations comprising i) (2+i)th set (S$_{(2+i)}$) such as those described for the first and second sets (S1, S2) and correspondingly ii) an additional (1+i)th pair (P$_{1+i}$) pairs (such as those described herein, wherein i=1, 2, etc.

For each combination described herein, the (2+i)th set (S$_{(2+i)}$) comprises one further first bar dipole magnet (x31)

having the first thickness (L1), the first length (L4) and the first width (L5), and having its magnetic axis oriented to be substantially parallel to the first plane, and two further second bar dipole magnets ($x32_a$ and $x32_b$) having the second thickness (L2), the second length (L6) and the second width (L7), the two second bar dipole magnets ($x32_a$, $x32_b$) having their upmost surfaces flush with each other, and having their magnetic axes oriented to be substantially perpendicular to the first plane, the first bar dipole magnet (x31) of the (2+i)th set ($S_{2+i}$) having a magnetic direction opposite to the magnetic direction of the first bar dipole magnet (x31) of the (2+i−1) set ($S_{2+i+1}$); the first bar dipole magnets (x31) of the (2+i)th and (2+i−1)th sets ($S_{2+i}$, $S_{2+i-1}$) being spaced apart by the first distance (d1); the first bar dipole magnet (x31) of the (2+i)th set ($S_{2+i}$) having substantially the same length (L5) and width (L4) as the first bar dipole magnet (x31) of the (2+i−1) set ($S_{2+i-1}$); and the two second bar dipole magnets ($x32_a$, $x32_b$) of the (2+i)th set ($S_{2+i}$) having substantially the same lengths (L6) and widths (L7) as the two second bar dipole magnets ($x32_a$, $x32_b$) of the (2+i−1) set ($S_{2+i-1}$); the first bar dipole magnet (x31) and the second bar dipole magnets ($x32_a$, $x32_b$) being aligned to form a column, in that the first bar dipole magnet (x31) of the (2+i)th set ($S_{2+i}$) is placed between and spaced apart from the second bar dipole magnets ($x32_a$, $x32_b$) by the second distance (d2); the first and second lengths (L4 and L6) being substantially the same; the North pole of one of the second bar dipole magnets ($x32_a$, $x32_b$) of the (2+i)th set ($S_{2+i}$) pointing towards the first plane and the North Pole of the first bar dipole magnet (x31) pointing towards that second bar dipole magnet, and the South pole of the other of the second bar dipole magnets ($x32_a$, $x32_b$) of the (2+i)th set ($S_{2+i}$) pointing towards the first plane and the South Pole of the first bar dipole magnet (x31) pointing towards that second bar dipole magnet, For each combination described herein, the (1+i)th pair ($P_{1+i}$) comprises the third bar dipole magnets ($x33_a$ and $x33_b$) having the third thickness (L3), the third length (L9) and the third width (L8) and having their magnetic axes oriented to be substantially parallel to the magnetic axes of the third bar dipole magnets ($x33_a$ and $x33_b$) of the (1+i−1)th pair ($P_{1+i-1}$).

As shown in FIG. 3, the magnetic assemblies (x00) may further comprise one or more combinations comprising c) a third set (S3) (i.e. a (2+i)th set with i=1) a such as those described herein and d) an additional second pair ($P_2$) pairs ((i.e. a ((1+i)th pair with i=1) such as those described herein. As shown for example in FIG. 3, the magnetic assemblies (x00) may further comprise c) a third set (S3), said third set (S3) comprising i) a further first bar dipole magnet (x31) and ii) two further second bar dipole magnets ($x32_a$ and $x32_b$) and d) a second pair (P2), said second pair (P2) comprising two further third bar dipole magnets ($x33_a$ and $x33_b$), wherein the first bar dipole magnets (x31) of the third set (S3), the second bar dipole magnets ($x32_a$ and $x32_b$) of the third set (S3) and the third bar dipole magnets ($x33_a$ and $x33_b$) of the second pair (P2) are at least partially embedded in the non-magnetic supporting matrix described herein (not shown in FIG. 3).

The first bar dipole magnet (x31) of the third set (S3) has the first thickness (L1), the first length (L4) and the first width (L5). The second bar dipole magnets ($x32_a$ and $x32_b$) of the third set (S3) have the second thickness (L2), the second length (L6) and the second width (L7) and have their upmost surfaces flush with each other.

The first bar dipole magnet (x31) of the third set (S3) has its magnetic axis oriented to be substantially parallel to the first plane (and substantially parallel to the substrate (x20) during the method described herein). The first bar dipole magnet (x31) of the third set (S3) has a magnetic direction opposite to the magnetic direction of the first bar dipole magnet (x31) of the second set (S2). The second bar dipole magnets ($x32_a$ and $x32_b$) of the third set (S3) have their magnetic axes oriented to be perpendicular to the first plane (and substantially perpendicular to the substrate (x20) during the method described herein).

The first bar dipole magnets (x31) of the third and second sets (S3, S2) are spaced apart by the first distance (d1), said first distance (d1) being substantially the same as the first distance (d1) for the first and second sets (S1, S2).

The first bar dipole magnet (x31) of the third set (S3) has substantially the same first length (L4) and first width (L5) as the first bar dipole magnet (x31) of the second set (S2) and the two second bar dipole magnets ($x32_a$, $x32_b$) of the third set (S3) have substantially the same second lengths (L6) and second widths (L7) as the two second bar dipole magnets ($x32_a$, $x32_b$) of the second set (S2). The first width (L5) of the first bar dipole magnet (x31) of the third set (S3) and second lengths (L6) of second bar dipole magnets ($x32_a$ and $x32_b$) of the third set (S3) are substantially the same.

The first bar dipole magnet (x31) and the second bar dipole magnets ($x32_a$, $x32_b$) of the third set (S3) are aligned to form a column, in that the first bar dipole magnet (x31) of the third set (S3) is placed between and spaced apart from the second bar dipole magnets ($x32_a$, $x32_b$) of the third set (S3) by the second distance (d2), said second distance (d2) being substantially the same as the second distance (d2) for the first and second sets (S1, S2).

The North pole of one of the second bar dipole magnets ($x32_a$, $x32_b$) of the third set (S3) points towards the first plane (and points towards the substrate (x20) during the method described herein) and the North Pole of the first bar dipole magnet (x31) points towards that second bar dipole magnet ($x32_a$, $x32_b$). The South pole of the other of the second bar dipole magnets ($x32_a$, $x32_b$) of the third set (S3) points towards the first plane (and points towards the substrate (x20) during the method described herein) and the South Pole of the first bar dipole magnet (x31) points towards that second bar dipole magnet ($x32_a$, $x32_b$).

The third bar dipole magnets ($x33_a$ and $x33_b$) of the second pair (P2) have the third thickness (L3), the third length (L8) and the third width (L9) and have their magnetic axes oriented to be parallel to the magnetic axes of the third bar dipole magnets ($x33_a$ and $x33_b$) of the first pair (P1) (and substantially parallel to the first plane and substantially parallel to the substrate (x20) during the method described herein).

Each of the third bar dipole magnets ($x33_a$ and $x33_b$) of the second pair (P2) is aligned with one second bar dipole magnet ($x32_a$ and $x32_b$) of the third set (S3) and one second bar dipole magnet ($x32_a$ and $x32_b$) of the second set (S2) so as to form two lines, the third bar dipole magnets ($x33_a$ and $x33_b$) being placed between and spaced apart from the respective second bar dipole magnets ($x32_a$ and $x32_b$) by the third distance (d3), the third distance (d3) being substantially the same as the third distance (d3) described herein.

The North poles of the third bar dipole magnets ($x33_a$ and $x33_b$) of the second pair (P2) respectively point towards one of the second bar dipole magnets ($x32_a$ and $x32_b$) of the third and second sets (S3, S2) and the North Poles of said one of the second bar dipole magnets ($x32_a$ and $x32_b$) point towards the first plane (and point towards to the substrate (x20) during the method described herein); or the South poles of the third bar dipole magnets ($x33_a$ and $x33_b$) of the second pair (P2) respectively point towards one of the second bar dipole magnets ($x32_a$ and $x32_b$) of the third and second sets (S3, S2) and the South Poles of said ones of the second bar dipole magnets ($x32_a$ and $x32_b$) point towards the first plane (and point towards to the substrate (x20) during the method described herein).

As shown in FIG. 4, the magnetic assemblies (x00) may further comprise one or more combinations comprising i) a fourth set ($S_4$) (i.e. a (2+i)th set with i=2) a such as those described herein and an additional third pair ($P_3$) pairs ((i.e. a (1+i)th pair with i=2) such as those described herein. As shown for example in FIG. 4, the magnetic assemblies (x00) may further comprise c) the third set (S3) described hereabove and a fourth set (S4), said a fourth set (S4) comprising i) a further first bar dipole magnet (x31) and ii) two further second bar dipole magnets ($x32_a$ and $x32_b$), d) the second pair (P2) described herein and a third pair (P3), said third pair (P3) comprising third bar dipole magnets ($x33_a$ and $x33_b$), wherein the first bar dipole magnets (x31) of the fourth set (S4), the second bar dipole magnets ($x32_a$ and $x32_b$) of the a fourth set (S4), and the third bar dipole magnets ($x33_a$ and $x33_b$) of the third pair (P3) are at least partially embedded in the non-magnetic supporting matrix described herein (not shown in FIG. 4).

The first bar dipole magnet (x31) of the fourth set (S4) has the first thickness (L1), the first length (L4) and the first width (L5). The second bar dipole magnets ($x32_a$ and $x32_b$) of the fourth set (S4) have the second thickness (L2), the second length (L6) and the second width (L7) and have their upmost surfaces flush with each other.

The first bar dipole magnet (x31) of the fourth set (S4) has its magnetic axis oriented to be substantially parallel to the first plane (and substantially parallel to the substrate (x20) during the method described herein). The first bar dipole magnet (x31) of the fourth set (S4) has a magnetic direction opposite to the magnetic direction of the first bar dipole magnet (x31) of the third set (S3). The second bar dipole magnets ($x32_a$ and $x32_b$) of the fourth set (S4) have their magnetic axes oriented to be perpendicular to the first plane (and substantially perpendicular to the substrate (x20) during the method described herein).

The first bar dipole magnets (x31) of the fourth and third sets (S4, S3) are spaced apart by the first distance (d1), said first distance (d1) being substantially the same as the first distance (d1) for the first and second sets (S1, S2) and substantially the same as the first distance (d1) for the second and third sets (S2, S3).

The first bar dipole magnet (x31) of the fourth set (S4) has substantially the same first length (L4) as the second length (L6) of the second bar dipole magnets ($x32_a$ and $x32_b$) of the fourth set (S4) and as the second length (L6) of the second bar dipole magnets ($x32_a$ and $x32_b$) of the third set (S3), of the second set (S2) and of the first set (S1).

The first bar dipole magnet (x31) of the fourth set (S4) has substantially the same first length (L4) and first width (L5) as the first bar dipole magnet (x31) of the third set (S3), as the first bar dipole magnet (x31) of the second set (S2) and as the first bar dipole magnet (x31) of the first set (S1).

The two second bar dipole magnets ($x32_a$, $x32_b$) of the fourth set (S4) have substantially the same second lengths (L6) and second widths (L7) as the two second bar dipole magnets ($x32_a$, $x32_b$) of the third set (S3), as the two second bar dipole magnets ($x32_a$, $x32_b$) of the second set (S2) and as the two second bar dipole magnets ($x32_a$, $x32_b$) of the first set (S1).

The first width (L5) of the first bar dipole magnet (x31) of the fourth set (S4) and second lengths (L6) of second bar dipole magnets ($x32_a$ and $x32_b$) of the fourth set (S4) are substantially the same.

The first bar dipole magnet (x31) and the second bar dipole magnets ($x32_a$, $x32_b$) of the fourth set (S4) are aligned to form a column, in that the first bar dipole magnet (x31) of the fourth set (S4) is placed between and spaced apart from the second bar dipole magnets ($x32_a$, $x32_b$) by the second distance (d2), said second distance (d2) being substantially the same as the second distance (d2) for the first and second sets (S1, S2) and for the second and third sets (S2, S3).

The North pole of one of the second bar dipole magnets ($x32_a$, $x32_b$) of the fourth set (S4) points towards the first plane (and points towards the substrate (x20) during the method described herein) and the North Pole of the first bar dipole magnet (x31) points towards that second bar dipole magnet. The South pole of the other of the second bar dipole magnets ($x32_a$, $x32_b$) of the fourth set (S4) points towards the first plane (and points towards the substrate (x20) during the method described herein) and the South Pole of the first bar dipole magnet (x31) points towards that second bar dipole magnet ($x32_a$, $x32_b$).

The third bar dipole magnets ($x33_a$ and $x33_b$) of the third pair (P3) have the third thickness (L3), the third length (L8) and the third width (L9) and have their magnetic axes oriented to be substantially parallel to the magnetic axes of the third bar dipole magnets ($x33_a$ and $x33_b$) of the first pair (P1) and be substantially parallel to the magnetic axes of the third bar dipole magnets ($x33_a$ and $x33_b$) of the second pair (P2) (and substantially parallel to the first plan and substantially parallel to the substrate (x20) during the method described herein).

Each of the third bar dipole magnets ($x33_a$ and $x33_b$) of the third pair (P3) is aligned with one second bar dipole magnet ($x32_a$ and $x32_b$) of the fourth set (S4) and one second bar dipole magnet ($x32_a$ and $x32_b$) of the third set (S3) so as to form two lines, the third bar dipole magnets ($x33_a$ and $x33_b$) being placed between and spaced apart from the respective second bar dipole magnets ($x32_a$ and $x32_b$) by the third distance (d3), the third distance (d3) being substantially the same as the third distance (d3) described herein.

The North poles of the third bar dipole magnets ($x33_a$ and $x33_b$) of the third pair (P3) respectively point towards one of the second bar dipole magnets ($x32_a$ and $x32_b$) of the fourth and third sets (S4, S3) and the North Poles of said ones of the second bar dipole magnets ($x32_a$ and $x32_b$) of the third pair (P3) point towards the first plane (and point towards to the substrate (x20) during the method described herein); or the South poles of the third bar dipole magnets ($x33_a$ and $x33_b$) of the third pair (P3) respectively point towards one of the second bar dipole magnets ($x32_a$ and $x32_b$) of the fourth and third sets (S4, S3) and the South Poles of said ones of the second bar dipole magnets ($x32_a$ and $x32_b$) pointing towards the first plane (and point towards to the substrate (x20) during the method described herein).

The top surface of the magnetic assemblies (x00) described herein and comprising the first bar dipole magnets (x31), the second bar dipole magnets ($x32_a$ and $x32_b$) and the third bar dipole magnets ($x33_a$ and $x33_b$) described herein may be flat and may be curved. For embodiments wherein the magnetic assembly (x00) is used in the vicinity of a cylinder (see for example FIG. 5B-G), the top surface of said assemblies (x00) is curved to match the curvature of the cylinder (see for example FIGS. 3B and 3C) and the curvature of the substrate (x20) carrying the coating layer (x10), wherein the curvature of the magnetic assembly (x00) is obtained by bending said assembly. For embodiments wherein the top surface of the assembly (x00) is curved, all the references directed to the first plane described herein and the orientation of the magnetic axis (substantially parallel/perpendicular to the first plane) described herein correspond to the magnetic assembly that has been flattened (i.e. its configuration before its bend). For embodiments wherein the top surface of the assembly (x00) is curved, the magnetic assembly (x00) is arranged around the first cylindrical plane so that the first width (L5) of the bar dipole magnets (x31), the second length (L6) of the two second bar dipole magnets (x32$_a$ and x32$_b$) and the third length (L8) of the third bar dipole magnets (x33$_a$ and x33$_b$) are essentially perpendicular to the rotational axis of the cylinder and the centers of (L5), (L6) and (L8) are essentially tangential to the cylinder surface. In these embodiments, the magnetic assembly (x00) forms a polyhedral surface around the curved first plane and around the cylinder. In these embodiments, the distance d3 correspond to the minimum distance between the respective sides of the two second bar dipole magnets (x32$_a$ or x32) and the third bar dipole magnets (x33$_a$ or x33$_b$).

The materials of the first bar dipole magnets (x31) of the sets (S1, S2, etc.) described herein, of the second bar dipole magnets (x32$_a$ and x32$_b$) of the sets (S1, S2, etc.) described herein, of the third bar dipole magnets (x33$_a$ and x33$_b$) of the pair(s) (P1, etc.) described herein as well as the first distance (d1), the second distance (d2), the third distance (d3), the fourth distance (d4) and distance (h) are selected such that the magnetic field resulting from the magnetic field produced by the magnetic assembly (x00) described herein is suitable for bi-axially orienting at least a part of the platelet-shaped magnetic or magnetisable pigment particles described herein to have both their X-axes and Y-axes substantially parallel to the substrate surface.

The first bar dipole magnets (x31) of the sets (S1, S2, etc.) described herein, the second bar dipole magnets (x32$_a$ and x32$_b$) of the sets (S1, S2, etc.) described herein, the third bar dipole magnets (x33$_a$ and x33$_b$) of the pair(s) (P1, etc.) described herein are preferably independently made of high-coercivity materials (also referred as strong magnetic materials). Suitable high-coercivity materials are materials having a maximum value of energy product (BH)$_{max}$ of at least 20 kJ/m$^3$, preferably at least 50 kJ/m$^3$, more preferably at least 100 kJ/m$^3$, even more preferably at least 200 kJ/m$^3$. They are preferably made of one or more sintered or polymer bonded magnetic materials selected from the group consisting of Alnicos such as for example Alnico 5 (R1-1-1), Alnico 5 DG (R1-1-2), Alnico 5-7 (R1-1-3), Alnico 6 (R1-1-4), Alnico 8 (R1-1-5), Alnico 8 HC (R1-1-7) and Alnico 9 (R1-1-6); hexaferrites of formula MFe$_{12}$O$_{19}$, (e.g. strontium hexaferrite (SrO*6Fe$_2$O$_3$) or barium hexaferrites (BaO*6Fe$_2$O$_3$)), hard ferrites of the formula MFe$_2$O$_4$ (e.g. as cobalt ferrite (CoFe$_2$O$_4$) or magnetite (Fe$_3$O$_4$)), wherein M is a bivalent metal ion), ceramic 8 (SI-1-5); rare earth magnetic materials selected from the group comprising RECo$_5$ (with RE=Sm or Pr), RE$_2$TM$_{17}$ (with RE=Sm, TM=Fe, Cu, Co, Zr, Hf), RE$_2$TM$_{14}$B (with RE=Nd, Pr, Dy, TM=Fe, Co); anisotropic alloys of Fe Cr Co; materials selected from the group of PtCo, MnAlC, RE Cobalt 5/16, RE Cobalt 14. Preferably, the high-coercivity materials of the bar dipole magnets are selected from the groups consisting of rare earth magnetic materials, and more preferably from the group consisting of Nd$_2$Fe$_{14}$B and SmCo$_5$. Particularly preferred are easily workable permanent-magnetic composite materials that comprise a permanent-magnetic filler, such as strontium-hexaferrite (SrFe$_{12}$O$_{19}$) or neodymium-iron-boron (Nd$_2$Fe$_{14}$B) powder, in a plastic- or rubber-type matrix. The first bar dipole magnets (x31), the second bar dipole magnet (x32$_a$ and x32$_b$) and the third bar dipole magnets (x33$_a$ and x33$_b$) may be made of one or more different materials or may be made of the same materials.

The first bar dipole magnets (x31) of the sets (S1, S2, etc.) described herein, the second bar dipole magnets (x32$_a$ and x32$_b$) of the sets (S1, S2, etc.) described herein and the third bar dipole magnets (x33$_a$ and x33$_b$) of the pair(s) (P1, etc.) described herein are at least partially embedded in the non-magnetic supporting matrix described herein, wherein said supporting matrix is used for holding the bar dipole magnets (x31, x32$_a$, x32$_b$, x33$_a$, x33$_b$) described herein together. The non-magnetic supporting matrix described herein is made of one or more non-magnetic materials. The non-magnetic materials are preferably selected from the group consisting of non-magnetic metals and engineering plastics and polymers. Non-magnetic metals include without limitation aluminum, aluminum alloys, brasses (alloys of copper and zinc), titanium, titanium alloys and austenitic steels (i.e. non-magnetic steels). Engineering plastics and polymers include without limitation polyaryletherketones (PAEK) and its derivatives polyetheretherketones (PEEK), polyetherketoneketones (PEKK), polyetheretherketoneketones (PEEKK) and polyetherketoneetherketoneketone (PEKEKK); polyacetals, polyamides, polyesters, polyethers, copolyetheresters, polyimides, polyetherimides, high-density polyethylene (HDPE), ultra-high molecular weight polyethylene (UHMWPE), polybutylene terephthalate (PBT), polypropylene, acrylonitrile butadiene styrene (ABS) copolymer, fluorinated and perfluorinated polyethylenes, polystyrenes, polycarbonates, polyphenylenesulfide (PPS) and liquid crystal polymers. Preferred materials are aluminum alloys, PEEK (polyetheretherketone), POM (polyoxymethylene), PTFE (polytetrafluoroethylene), Nylon® (polyamide) and PPS.

Also described herein are printing apparatuses comprising the magnetic assembly (x00) described herein and a transferring device (x70), said transferring device allowing the substrate (x20) comprising the radiation curable coating composition comprising the platelet-shaped magnetic or magnetisable pigment particles described herein to be transferred or conveyed in the vicinity of and on top of the magnetic assembly (x00) described herein so as to bi-axially orient at least a part of the platelet-shaped magnetic or magnetisable pigment particles and also provides a constant distance between the substrate (x20) and the magnetic assembly (x00).

The transferring device described herein consists of a substrate guiding system, preferably selected from the group consisting of chains, belts, cylinders and combinations thereof. The belts described herein may comprise magnets mounted thereon (referred in the art as linear magnetic transferring devices). The belts described herein preferably comprise grippers. The cylinders described herein are rotating cylinders (x60, x70) which may comprise hard magnetic magnets (M1) mounted thereon (referred in the art as rotating magnetic orienting cylinder) or soft magnetic plates (M1) carrying one or more indicia in the form of voids and/or indentations and/or protrusions.

Figure 5A:
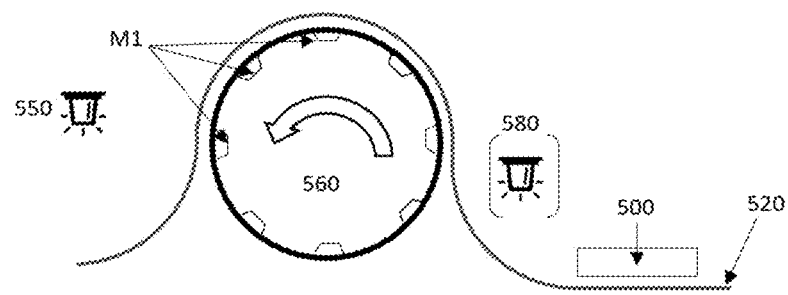
FIG. 5A-C schematically illustrate methods for producing an optical effect layer (OEL) on a substrate (520) according to the present invention. The method comprises a step of ii) of exposing the coating layer to the magnetic field of the magnetic assembly (500), a further step of subsequently exposing the coating layer to the magnetic field of a magnetic-field-generating device comprising one or more magnets (M1), said magnets (M1) being mounted on a rotating magnetic cylinder (560), and a step iii) of at least partially curing the radiation curable coating composition with a curing unit (550).
Figure 5B:
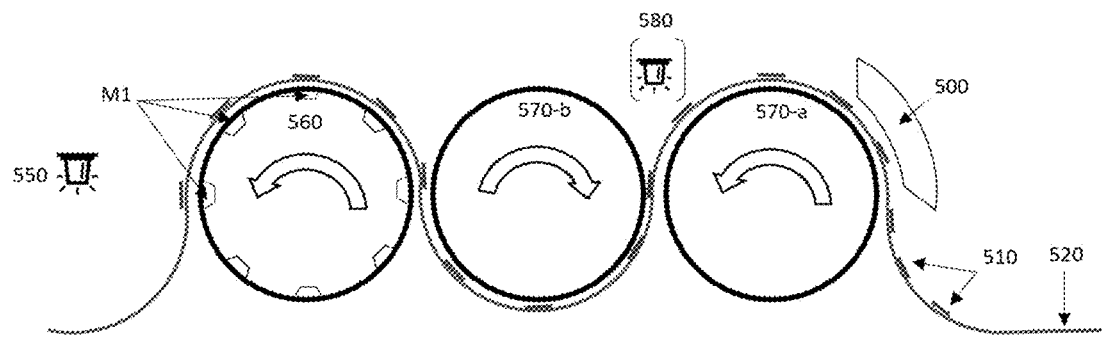
Figure 5C:
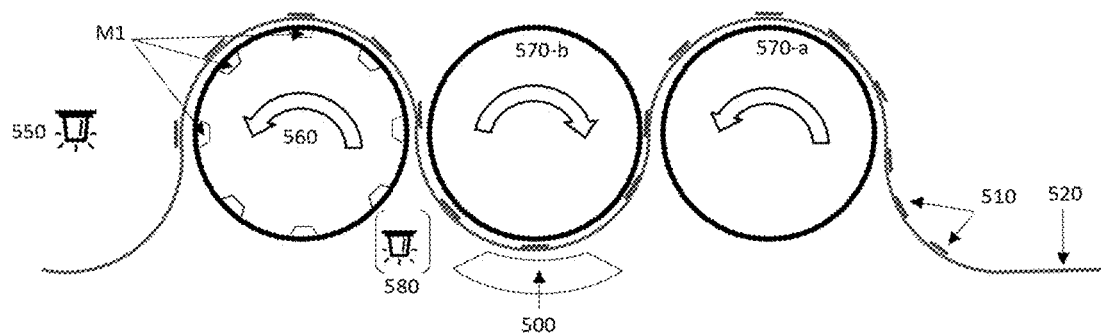
Figure 5D:
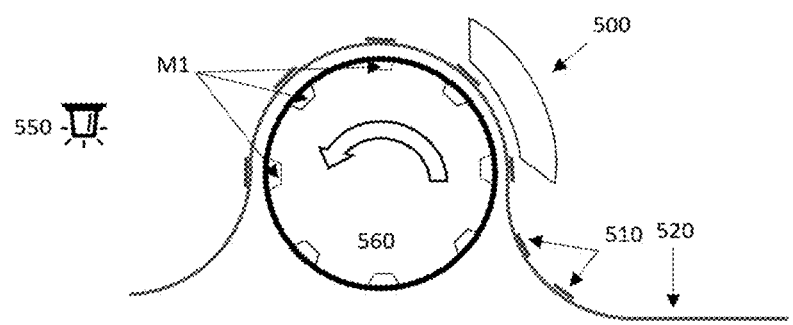
FIG. 5D schematically illustrates a method for producing an optical effect layer (OEL) on a substrate (520) according to the present invention. The method comprises a step of ii) of exposing, in a single step, the radiation curable coating composition to the interaction of the magnetic fields of the magnetic assembly (500) described herein and of a magnetic-field-generating device comprising one or more hard magnetic magnets (M1) or comprising one or more soft magnetic plates (M1) carrying one or more indicia in the form of voids and/or indentations and/or protrusions, said one or more hard magnetic magnets or soft magnetic plates (M1) being mounted on a rotating magnetic cylinder (560) and a step iii) of at least partially curing the radiation curable coating composition with a curing unit (550).

For embodiments of methods wherein a single magnetic assembly (x00) is used as shown for example in FIG. 5A-D, said magnetic assembly (x00) herein may be mounted in the vicinity of the transferring device described herein, wherein said transferring device is preferably a belt comprising grippers (see for example FIG. 5A) or is mounted in the vicinity of the transferring device described herein, wherein said transferring device is preferably a rotating cylinder (x60, x70 and x70-*b*) (see FIG. 5B-D).

Figure 5E:
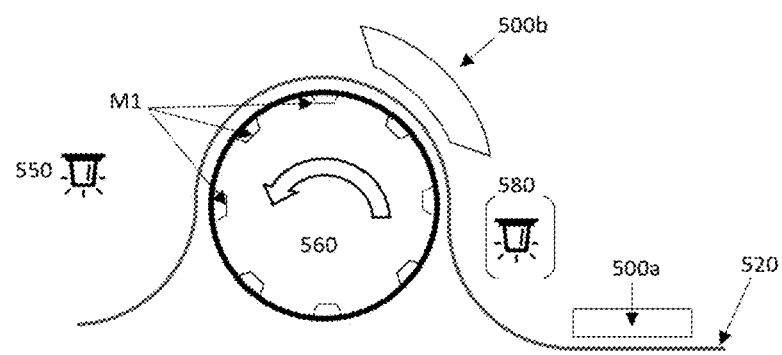
FIG. 5E schematically illustrates a method for producing an optical effect layer (OEL) on a substrate (520) according to the present invention. The method comprises a step of ii) of a) exposing the radiation curable coating composition to the magnetic field of a first magnetic assembly (500*a*) described herein; then b) exposing, in a single step, the radiation curable coating composition to the interaction of the magnetic fields of the magnetic assembly (500*b*) described herein and of a magnetic-field-generating device comprising one or more hard magnetic magnets (M1) or comprising one or more soft magnetic plates (M1) carrying one or more indicia in the form of voids and/or indentations and/or protrusions, said one or more hard magnetic magnets or soft magnetic plates (M1) being mounted on a rotating magnetic cylinder (560) and a step iii) of at least partially curing the radiation curable coating composition with a curing unit (550).
Figure 5F:
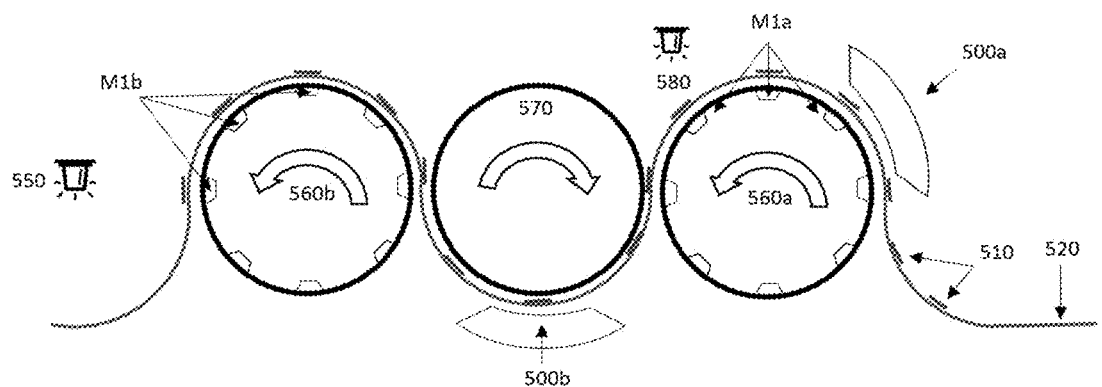
FIG. 5F schematically illustrate a method for producing an optical effect layer (OEL) on a substrate (520) according to the present invention. The method comprises a step of ii) of exposing, in a single step, the radiation curable coating composition to the interaction of the magnetic fields of a first magnetic assembly (500*a*) described herein and of a first magnetic-field-generating device comprising one or more hard magnetic magnets (M1*a*) or comprising one or more soft magnetic plates (M1*a*) carrying one or more indicia in the form of voids and/or indentations and/or protrusions, said one or more hard magnetic magnets or soft magnetic plates (M1*a*) being mounted on a rotating magnetic cylinder (560*a*); a step iii) (depicted with a selective curing unit (580)) of selectively at least partially curing one or more first areas of the coating layer of step ii) so as to fix at least a part of the non-spherical magnetic or magnetizable particles in their adopted positions and orientations such that one or more second areas of the coating layer are not exposed to irradiation; a step iv) of exposing the coating layer to the magnetic field of a second magnetic assembly (500*b*) described herein so as to biaxially re-orient the non-spherical magnetic or magnetizable particles comprised in the one or more second (not yet cured) areas of the coating layer; a step v) of exposing the radiation curable coating composition to the magnetic field of a second magnetic-field-generating device comprising one or more hard magnetic magnets (M1*b*), said one or more hard magnetic magnets (M1*b*) being mounted on a rotating magnetic cylinder (560*b*); and a step vi) of at least partially curing the radiation curable coating composition with a curing unit (550).
Figure 5G:
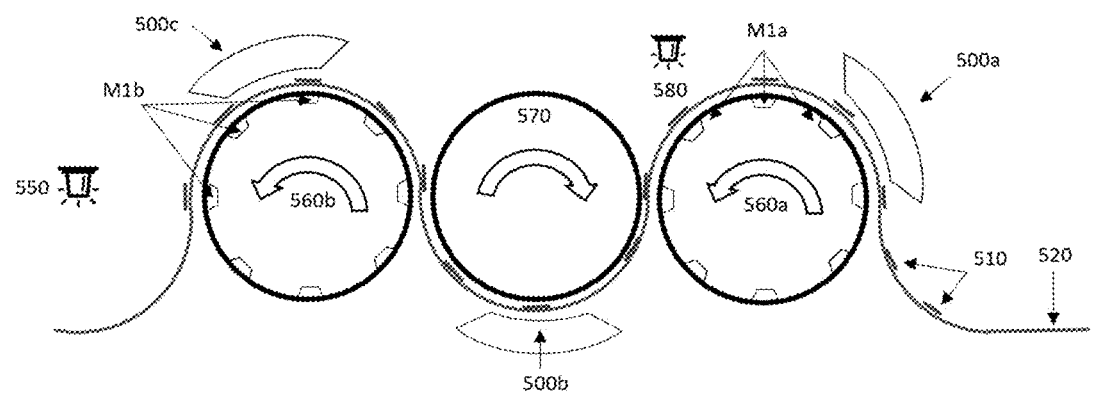
FIG. 5G schematically illustrate a method for producing an optical effect layer (OEL) on a substrate (520) according to the present invention. The method comprises a step of ii) of exposing, in a single step, the radiation curable coating composition to the interaction of the magnetic fields of a first magnetic assembly (500*a*) described herein and of a first magnetic-field-generating device comprising one or more hard magnetic magnets (M1*a*) or comprising one or more soft magnetic plates (M1*a*) carrying one or more indicia in the form of voids and/or indentations and/or protrusions, said one or more hard magnetic magnets or soft magnetic plates (M1*a*) being mounted on a rotating magnetic cylinder (560*a*); a step iii) (depicted with a selective curing unit (580)) of selectively at least partially curing one or more first areas of the coating layer of step ii) so as to fix at least a part of the non-spherical magnetic or magnetizable particles in their adopted positions and orientations such that one or more second areas of the coating layer are not exposed to irradiation; a step iv) of exposing the coating layer to the magnetic field of a second magnetic assembly (500*b*) described herein so as to biaxially re-orient the non-spherical magnetic or magnetizable particles comprised in the one or more second (not yet cured) areas of the coating layer; a step v) exposing, in a single step, the radiation curable coating composition to the interaction of the magnetic fields of a third magnetic assembly (500*c*) described herein and of a second magnetic-field-generating device comprising one or more hard magnetic magnets (M1*b*) or comprising one or more soft magnetic plates (M1*b*) carrying one or more indicia in the form of voids and/or indentations and/or protrusions, said one or more hard magnetic magnets or soft magnetic plates (M1*b*) being mounted on a rotating magnetic cylinder (560) and a step vi) of at least partially curing the radiation curable coating composition with a curing unit (550).
Figure 5H:
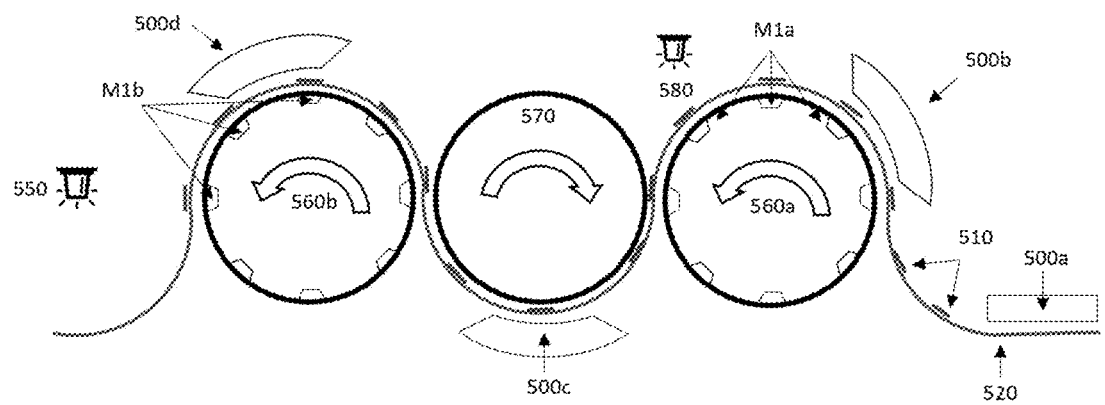
FIG. 5H schematically illustrate a method for producing an optical effect layer (OEL) on a substrate (520) according to the present invention. The method comprises a step of ii) of a) exposing the radiation curable coating composition to the magnetic fields of a first magnetic assembly (500*a*) described herein; then b) exposing, in a single step, the radiation curable coating composition to the interaction of the magnetic fields of a second magnetic assembly (500*b*)

For embodiments of methods wherein several magnetic assemblies (x00*a*, x00-*b*, etc.), i.e. a first magnetic assembly (x00*a*), a second magnetic assembly (x00*b*), etc., are independently used as shown for example in FIG. 5E-H, the first magnetic assembly (x00*a*) described herein is mounted in the vicinity of the transferring device described herein, wherein said transferring device is preferably a belt comprising grippers (see FIGS. 5E and 5H) or mounted in the vicinity of a rotating cylinder (x60) (see FIGS. 5F and 5G), while further magnetic assemblies (x00*b*, x00*c*, etc.) are mounted in the vicinity of a transferring device such as those described herein, wherein said transferring device preferably being a rotating cylinder (x70) (see FIGS. 5F, 5G and 5H) or a rotating magnetic cylinder (x60) (see FIGS. 5E, 5G and 5H).

For embodiments wherein the magnetic assembly (x00) is used in the vicinity of a rotating cylinder (see for example FIG. 5B-H), the top surface of said assemblies (x00) is preferably curved to match the curvature of the cylinder (see for example FIGS. 3B and 3C) and the curvature of the substrate (x20) carrying the coating layer (x10), it is preferred that the ratio between the diameter of the cylinder and the first width (L4) of the first bar dipole magnets (x31) is greater to or equal to about 5.

As shown for example in FIGS. 2A and 5A-H, the printing apparatuses described herein may further comprise a curing unit (x50). Suitable curing units include equipments for UV-visible curing units comprising a high-power light-emitting-diode (LED) lamp, or an arc discharge lamp, such as a medium-pressure mercury arc (MPMA) or a metal-vapor arc lamp, as the source of the actinic radiation.

As shown for example in FIGS. 5A-C and 5E-5H, the printing apparatuses described herein may further comprise one or more selective curing units (x80). Selective curing allows the production of optical effect layers (OELs) exhibiting a motif made of at least two areas, wherein said two areas have two different magnetic orientation patterns. The one or more selective curing units (x80) may comprise one or more fixed or removable photomasks including one or more voids corresponding to a pattern to be formed as a part of the coating layer. The one or more selective curing units (x80) may be addressable such as the scanning laser beam disclosed in EP 2 468 423 A1, an array of light-emitting diodes (LEDs) disclosed in WO 2017/021504 A1 or an actinic radiation LED source (x41) comprising an array of individually addressable actinic radiation emitters disclosed in the co-pending patent application PCT/EP2019/087072.

The printing apparatuses described herein may further comprise a coating or printing unit for applying the radiation curable coating composition comprising the non-spherical magnetic or magnetizable pigment particles described herein on the substrate described herein. The printing unit may be a screen printing unit, a rotogravure printing unit, a flexography printing unit, an inkjet printing unit, an intaglio printing unit (also referred in the art as engraved copper plate printing and engraved steel die printing) or a combination thereof.

The printing apparatuses described herein may further comprise a substrate feeder so that the substrate (x20) is fed by said substrate feeder under the form of sheets or a web.

The present invention provides methods for producing optical effect layers (OEL) on substrates. The method described herein comprises a step i) of applying onto the substrate (x20) surface described herein the radiation curable coating composition comprising the platelet-shaped magnetic or magnetizable pigment particles described herein so as to form the coating layer (x10) described herein, said composition being in a first liquid state which allows its application as a layer and which is in a not yet cured (i.e. wet) state wherein the platelet-shaped magnetic or magnetizable pigment particles can move and rotate within the composition. Since the radiation curable coating composition described herein is to be provided on a substrate (x20) surface, the radiation curable coating composition comprises at least a binder material such as those described herein and the platelet-shaped magnetic or magnetizable pigment particles, wherein said composition is in a form that allows its processing on the desired printing or coating equipment. Preferably, said step i) is carried out by a printing process, preferably selected from the group consisting of screen printing, rotogravure printing, flexography printing, inkjet printing and intaglio printing (also referred in the art as engraved copper plate printing and engraved steel die printing), more preferably selected from the group consisting of intaglio printing, screen printing, rotogravure printing and flexography printing and still more preferably selected from the group consisting of screen printing, rotogravure printing and flexography printing.

The radiation curable coating composition described herein as well as the coating layer (x10) described herein comprise the platelet-shaped magnetic or magnetizable pigment particles described herein preferably in an amount from about 5 wt-% to about 40 wt-%, more preferably about 10 wt-% to about 30 wt-%, the weight percentages being based on the total weight of the radiation curable coating composition or the coating composition.

The platelet-shaped magnetic or magnetizable pigment particles described herein have, due to their non-spherical shape, non-isotropic reflectivity with respect to incident electromagnetic radiation for which the hardened/cured binder material is at least partially transparent. As used herein, the term "non-isotropic reflectivity" denotes that the proportion of incident radiation from a first angle that is reflected by a particle into a certain (viewing) direction (a second angle) is a function of the orientation of the particles, i.e. that a change of the orientation of the particle with respect to the first angle can lead to a different magnitude of the reflection to the viewing direction.

The OEL described herein comprises platelet-shaped magnetic or magnetizable pigment particles that, due to their shape, have non-isotropic reflectivity. In the OELs described herein, the platelet-shaped magnetic or magnetizable pigment particles described herein are dispersed in the coating composition comprising a cured binder material that fixes the orientation of the platelet-shaped magnetic or magnetizable pigment particles. The binder material is at least in its cured or solid state (also referred to as second state herein), at least partially transparent to electromagnetic radiation of a range of wavelengths comprised between 200 nm and 2500 nm, i.e. within the wavelength range which is typically referred to as the "optical spectrum" and which comprises infrared, visible and UV portions of the electromagnetic spectrum. Accordingly, the particles contained in the binder material in its cured or solid state and their orientation-dependent reflectivity can be perceived through the binder material at some wavelengths within this range. Preferably, the cured binder material is at least partially transparent to electromagnetic radiation of a range of wavelengths comprised between 200 nm and 800 nm, more preferably comprised between 400 nm and 700 nm. Herein, the term "transparent" denotes that the transmission of electromagnetic radiation through a layer of 20 μm of the hardened binder material as present in the OEL (not including the platelet-shaped magnetic or magnetizable pigment particles, but all other optional components of the OEL in case such components are present) is at least 50%, more preferably at least 60%, even more preferably at least 70%, at the wavelength(s) concerned. This can be determined for example by measuring the transmittance of a test piece of the hardened binder material (not including the platelet-shaped magnetic or magnetizable pigment particles) in accordance with well-established test methods, e.g. DIN 5036-3 (1979-11). If the OEL serves as a covert security feature, then typically technical means will be necessary to detect the (complete) optical effect generated by the OEL under respective illuminating conditions comprising the selected non-visible wavelength; said detection requiring that the wavelength of incident radiation is selected outside the visible range, e.g. in the near UV-range.

Suitable examples of platelet-shaped magnetic or magnetizable pigment particles described herein include without limitation pigment particles comprising a magnetic metal selected from the group consisting of cobalt (Co), iron (Fe), and nickel (Ni); a magnetic alloy of iron, manganese, cobalt, nickel or a mixture of two or more thereof; a magnetic oxide of chromium, manganese, cobalt, iron, nickel or a mixture of two or more thereof; or a mixture of two or more thereof. The term "magnetic" in reference to the metals, alloys and oxides is directed to ferromagnetic or ferrimagnetic metals, alloys and oxides. Magnetic oxides of chromium, manganese, cobalt, iron, nickel or a mixture of two or more thereof may be pure or mixed oxides. Examples of magnetic oxides include without limitation iron oxides such as hematite ($Fe_2O_3$), magnetite ($Fe_3O_4$), chromium dioxide ($CrO_2$), magnetic ferrites ($MFe_2O_4$), magnetic spinels ($MR_2O_4$), magnetic hexaferrites ($MFe_{12}O_{19}$), magnetic orthoferrites ($RFeO_3$), magnetic garnets $M_3R_2(AO_4)_3$, wherein M stands for two-valent metal, R stands for three-valent metal, and A stands for four-valent metal.

Examples of platelet-shaped magnetic or magnetizable pigment particles described herein include without limitation pigment particles comprising a magnetic layer M made from one or more of a magnetic metal such as cobalt (Co), iron (Fe), or nickel (Ni); and a magnetic alloy of iron, cobalt or nickel, wherein said magnetic or magnetizable pigment particles may be multilayered structures comprising one or more additional layers. Preferably, the one or more additional layers are layers A independently made from one or more selected from the group consisting of metal fluorides such as magnesium fluoride ($MgF_2$), silicon oxide (SiO), silicon dioxide ($SiO_2$), titanium oxide ($TiO_2$), and aluminum oxide ($Al_2O_3$), more preferably silicon dioxide ($SiO_2$); or layers B independently made from one or more selected from the group consisting of metals and metal alloys, preferably selected from the group consisting of reflective metals and reflective metal alloys, and more preferably selected from the group consisting of aluminum (Al), chromium (Cr), and nickel (Ni), and still more preferably aluminum (Al); or a combination of one or more layers A such as those described hereabove and one or more layers B such as those described hereabove. Typical examples of the platelet-shaped magnetic or magnetizable pigment particles being multilayered structures described hereabove include without limitation A/M multilayer structures, A/M/A multilayer structures, A/M/B multilayer structures, A/B/M/A multilayer structures, A/B/M/B multilayer structures, A/B/M/B/A/multilayer structures, B/M multilayer structures, B/M/B multilayer structures, B/A/M/A multilayer structures, B/A/M/B multilayer structures, B/A/M/B/A/multilayer structures, wherein the layers A, the magnetic layers M and the layers B are chosen from those described hereabove.

The radiation curable coating composition described herein may comprise platelet-shaped optically variable magnetic or magnetizable pigment particles, and/or platelet-shaped magnetic or magnetizable pigment particles having no optically variable properties. Preferably, at least a part of the platelet-shaped magnetic or magnetizable pigment particles described herein is constituted by platelet-shaped optically variable magnetic or magnetizable pigment particles. In addition to the overt security provided by the colorshifting property of the optically variable magnetic or magnetizable pigment particles, which allows easily detecting, recognizing and/or discriminating an article or security document carrying an ink, coating composition, or coating layer comprising the optically variable magnetic or magnetizable pigment particles described herein from their possible counterfeits using the unaided human senses, the optical properties of the optically variable magnetic or magnetizable pigment particles may also be used as a machine readable tool for the recognition of the OEL. Thus, the optical properties of the optically variable magnetic or magnetizable pigment particles may simultaneously be used as a covert or semi-covert security feature in an authentication process wherein the optical (e.g. spectral) properties of the pigment particles are analyzed.

The use of platelet-shaped optically variable magnetic or magnetizable pigment particles in coating layers for producing an OEL enhances the significance of the OEL as a security feature in security document applications, because such materials are reserved to the security document printing industry and are not commercially available to the public.

As mentioned above, preferably at least a part of the platelet-shaped magnetic or magnetizable pigment particles is constituted by platelet-shaped optically variable magnetic or magnetizable pigment particles. These are more preferably selected from the group consisting of magnetic thin-film interference pigment particles, magnetic cholesteric liquid crystal pigment particles, interference coated pigment particles comprising a magnetic material and mixtures of two or more thereof.

Magnetic thin film interference pigment particles are known to those skilled in the art and are disclosed e.g. in U.S. Pat. No. 4,838,648; WO 2002/073250 A2; EP 0 686 675 B1; WO 2003/000801 A2; U.S. Pat. No. 6,838,166; WO 2007/131833 A1; EP 2 402 401 B1; WO 2019/103937 A1; WO 2020/006286 A1 and in the documents cited therein. Preferably, the magnetic thin film interference pigment particles comprise pigment particles having a five-layer Fabry-Perot multilayer structure and/or pigment particles having a six-layer Fabry-Perot multilayer structure and/or pigment particles having a seven-layer Fabry-Perot multilayer structure and/or pigments particles having a multilayer structure combining one or more multilayer Fabry-Perot structures.

Preferred five-layer Fabry-Perot multilayer structures consist of absorber/dielectric/reflector/dielectric/absorber multilayer structures wherein the reflector and/or the absorber is also a magnetic layer, preferably the reflector and/or the absorber is a magnetic layer comprising nickel, iron and/or cobalt, and/or a magnetic alloy comprising nickel, iron and/or cobalt and/or a magnetic oxide comprising nickel (Ni), iron (Fe) and/or cobalt (Co).

Preferred six-layer Fabry-Perot multilayer structures consist of absorber/dielectric/reflector/magnetic/dielectric/absorber multilayer structures.

Preferred seven-layer Fabry Perot multilayer structures consist of absorber/dielectric/reflector/magnetic/reflector/dielectric/absorber multilayer structures such as disclosed in U.S. Pat. No. 4,838,648.

Preferred pigments particles having a multilayer structure combining one or more Fabry-Perot structures are those described in WO 2019/103937 A1 and consist of combinations of at least two Fabry-Perot structures, said two Fabry-Perot structures independently comprising a reflector layer, a dielectric layer and an absorber layer, wherein the reflector and/or the absorber layer can each independently comprise one or more magnetic materials and/or wherein a magnetic layer is sandwich between the two structures. WO 2020/006/286 A1 and EP 3 587 500 A1 disclose further preferred pigment particles having a multilayer structure.

Preferably, the reflector layers described herein are independently made from one or more selected from the group consisting of metals and metal alloys, preferably selected from the group consisting of reflective metals and reflective metal alloys, more preferably selected from the group consisting of aluminum (Al), silver (Ag), copper (Cu), gold (Au), platinum (Pt), tin (Sn), titanium (Ti), palladium (Pd), rhodium (Rh), niobium (Nb), chromium (Cr), nickel (Ni), and alloys thereof, even more preferably selected from the group consisting of aluminum (Al), chromium (Cr), nickel (Ni) and alloys thereof, and still more preferably aluminum (Al). Preferably, the dielectric layers are independently made from one or more selected from the group consisting of metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g. $Na_3AlF_6$), neodymium fluoride ($NdF_3$), samarium fluoride ($SmF_3$), barium fluoride ($BaF_2$), calcium fluoride ($CaF_2$), lithium fluoride (LiF), and metal oxides such as silicon oxide (SiO), silicium dioxide ($SiO_2$), titanium oxide ($TiO_2$), aluminum oxide ($Al_2O_3$), more preferably selected from the group consisting of magnesium fluoride ($MgF_2$) and silicon dioxide ($SiO_2$) and still more preferably magnesium fluoride ($MgF_2$). Preferably, the absorber layers are independently made from one or more selected from the group consisting of aluminum (Al), silver (Ag), copper (Cu), palladium (Pd), platinum (Pt), titanium (Ti), vanadium (V), iron (Fe) tin (Sn), tungsten (W), molybdenum (Mo), rhodium (Rh), Niobium (Nb), chromium (Cr), nickel (Ni), metal oxides thereof, metal sulfides thereof, metal carbides thereof, and metal alloys thereof, more preferably selected from the group consisting of chromium (Cr), nickel (Ni), metal oxides thereof, and metal alloys thereof, and still more preferably selected from the group consisting of chromium (Cr), nickel (Ni), and metal alloys thereof. Preferably, the magnetic layer comprises nickel (Ni), iron (Fe) and/or cobalt (Co); and/or a magnetic alloy comprising nickel (Ni), iron (Fe) and/or cobalt (Co); and/or a magnetic oxide comprising nickel (Ni), iron (Fe) and/or cobalt (Co). When magnetic thin film interference pigment particles comprising a seven-layer Fabry-Perot structure are preferred, it is particularly preferred that the magnetic thin film interference pigment particles comprise a seven-layer Fabry-Perot absorber/dielectric/reflector/magnetic/reflector/dielectric/absorber multilayer structure consisting of a Cr/$MgF_2$/Al/Ni/Al/$MgF_2$/Cr multilayer structure.

The magnetic thin film interference pigment particles described herein may be multilayer pigment particles being considered as safe for human health and the environment and being based for example on five-layer Fabry-Perot multilayer structures, six-layer Fabry-Perot multilayer structures and seven-layer Fabry-Perot multilayer structures, wherein said pigment particles include one or more magnetic layers comprising a magnetic alloy having a substantially nickel-free composition including about 40 wt-% to about 90 wt-% iron, about 10 wt-% to about 50 wt-% chromium and about 0 wt-% to about 30 wt-% aluminum. Typical examples of multilayer pigment particles being considered as safe for human health and the environment can be found in EP 2 402 401 B1 whose content is hereby incorporated by reference in its entirety.

Magnetic thin film interference pigment particles described herein are typically manufactured by a conventional deposition technique of the different required layers onto a web. After deposition of the desired number of layers, e.g. by physical vapor deposition (PVD), chemical vapor deposition (CVD) or electrolytic deposition, the stack of layers is removed from the web, either by dissolving a release layer in a suitable solvent, or by stripping the material from the web. The so-obtained material is then broken down to flakes which have to be further processed by grinding, milling (such as for example jet milling processes) or any suitable method so as to obtain pigment particles of the required size. The resulting product consists of flat flakes with broken edges, irregular shapes and different aspect ratios. Further information on the preparation of suitable magnetic thin film interference pigment particles can be found e.g. in EP 1 710 756 A1 and EP 1 666 546 A1 whose contents are hereby incorporated by reference.

Suitable magnetic cholesteric liquid crystal pigment particles exhibiting optically variable characteristics include without limitation magnetic monolayered cholesteric liquid crystal pigment particles and magnetic multilayered cholesteric liquid crystal pigment particles. Such pigment particles are disclosed for example in WO 2006/063926 A1, U.S. Pat. Nos. 6,582,781 and 6,531,221. WO 2006/063926 A1 discloses monolayers and pigment particles obtained therefrom with high brilliance and colorshifting properties with additional particular properties such as magnetizability. The disclosed monolayers and pigment particles, which are obtained therefrom by comminuting said monolayers, include a three-dimensionally crosslinked cholesteric liquid crystal mixture and magnetic nanoparticles. U.S. Pat. Nos. 6,582,781 and 6,410,130 disclose platelet-shaped cholesteric multilayer pigment particles which comprise the sequence $A^1$/B/$A^2$, wherein $A^1$ and $A^2$ may be identical or different and each comprises at least one cholesteric layer, and B is an interlayer absorbing all or some of the light transmitted by the layers $A^1$ and $A^2$ and imparting magnetic properties to said interlayer. U.S. Pat. No. 6,531,221 discloses platelet-shaped cholesteric multilayer pigment particles which comprise the sequence A/B and optionally C, wherein A and C are absorbing layers comprising pigment particles imparting magnetic properties, and B is a cholesteric layer.

Suitable interference coated pigments comprising one or more magnetic materials include without limitation structures consisting of a substrate selected from the group consisting of a core coated with one or more layers, wherein at least one of the core or the one or more layers have magnetic properties. For example, suitable interference coated pigments comprise a core made of a magnetic material such as those described hereabove, said core being coated with one or more layers made of one or more metal oxides, or they have a structure consisting of a core made of synthetic or natural micas, layered silicates (e.g. talc, kaolin and sericite), glasses (e.g. borosilicates), silicon dioxides ($SiO_2$), aluminum oxides ($Al_2O_3$), titanium oxides ($TiO_2$), graphites and mixtures of two or more thereof. Furthermore, one or more additional layers such as coloring layers may be present.

The magnetic or magnetizable pigment particles described herein may be surface treated so as to protect them against any deterioration that may occur in the coating composition and coating layer and/or to facilitate their incorporation in said coating composition and coating layer; typically corrosion inhibitor materials and/or wetting agents may be used.

The method described herein further comprises the step ii) of exposing the coating layer (x10) to the magnetic field of the magnetic assembly (x00) described herein so as to bi-axially orient at least a part of the platelet-shaped magnetic or magnetisable pigment particles to have both their X-axis and Y-axis substantially parallel to the substrate (x20) surface and a step iii) of at least partially curing the radiation curable coating composition of step ii) to a second state so as to fix the platelet-shaped magnetic or magnetizable pigment particles in their adopted positions and orientations. As used herein, by "at least partially curing the radiation curable coating composition", it means that the platelet-shaped magnetic or magnetizable pigment particles are fixed/frozen in their adopted positions and orientations and cannot move and rotate anymore (also referred in the art as "pinning" of the particles).

The distance (h) (shown for example in FIG. 2), from the uppermost surface of the bar dipole magnets (x31) of the sets (S1, S2, S3, etc.) of the magnetic assembly (x00) described herein and the lowermost surface of the substrate (x20) facing said magnetic assembly is preferably smaller than about 20 mm and greater than or equal to 2 about mm, more preferably smaller than or equal to about 10 mm and greater than or equal to 4 about mm and still more preferably smaller than or equal to about 7 mm and greater than or equal to 2 about mm.

According to one embodiment, the method described herein comprises the step ii) of exposing the coating layer (x10) to the magnetic field of the magnetic assembly (x00) consists of a single step using the magnetic assembly (x00) described herein. The method described herein comprises the step iii) of at least partially curing the radiation curable coating composition of step ii) to allow the platelet-shaped magnetic or magnetizable pigment particles to be fixed in their adopted positions and orientations, wherein said at least partially curing step may be carried out partially simultaneously with or subsequently to step ii). During the method described herein, the magnetic assembly (x00) described herein is preferably a static device. The magnetic assembly (x00) described herein is mounted in the vicinity of the transferring device described herein, wherein said transferring device is preferably a belt comprising grippers or one or more rotating cylinders.

According to one embodiment shown for example in FIG. 5A-5C, the method described herein comprises the step ii) of exposing the coating layer (x10) to the magnetic field of the magnetic assembly (x00) and a further step of subsequently exposing the coating layer (x10) to the magnetic field of a magnetic-field-generating device comprising one or more hard magnetic magnets (M1), said one or more hard magnetic magnets (M1) being preferably mounted on a rotating magnetic cylinder (x60), so as to mono-axially re-orient at least a part of the platelet-shaped magnetic or magnetisable particles, said further step being carried out subsequently to step ii). The method described herein comprises the step iii) of at least partially curing the radiation curable coating composition of step ii), wherein said step may be carried out partially simultaneously with or subsequently to the step of mono-axially re-orienting the platelet-shaped magnetic or magnetisable particles, preferably partially simultaneously with said step of re-orienting. WO 2015/086257 A1 discloses processes wherein a subsequent step of mono-axially re-orienting the platelet-shaped magnetic or magnetisable particles is also carried out. During the method described herein, the magnetic assembly (x00) described herein is preferably a static device. FIG. 5A-C illustrate said method, wherein the one or more magnets (M1) of the magnetic-field-generating device are mounted on the rotating magnetic cylinder described herein (560) and the substrate (520) carrying the coating layer (510, not shown in FIG. 5A) concomitantly moves with said rotating magnetic cylinder (560). According to one embodiment shown in FIG. 5A, the magnetic assembly (500) described herein is mounted in the vicinity of the transferring device described herein, wherein said transferring device is preferably a belt comprising grippers. According to another embodiment shown in FIG. 5B-C, the magnetic assembly (500) described herein is mounted in the vicinity of the transferring device described herein, wherein said transferring device preferably consists of one or more cylinders (570-a and 570-b).

The method described in FIG. 5A may be carried out with the substrate (520) facing the magnetic assembly (500); however, the same method may be carried out with the coating layer (510 not shown in FIG. 5A) facing the magnetic assembly (500).

According to one embodiment shown for example in FIG. 5D, the method described herein comprises a step ii) of exposing, in a single step, the coating layer (x10) to the interaction of magnetic fields of the magnetic assembly (x00) described herein and of a magnetic-field-generating device comprising one or more hard magnetic magnets (M1), the one or more hard magnetic magnets (M1) being preferably mounted on a rotating magnetic cylinder (x60) also acting as transferring device. The method described herein comprises the step iii) of at least partially curing the radiation curable coating composition of step ii), wherein said step may be carried out partially simultaneously with or subsequently to step ii). During the method described herein, the magnetic assembly (x00) described herein is preferably a static device and the one or more hard magnetic magnets (M1) concomitantly move with the substrate (x20) carrying the coating layer (x10). FIG. 5D illustrates said method, wherein the magnets (M1) of the magnetic-field-generating device are mounted on the rotating magnetic cylinder described herein (560) and the substrate (520) carrying the coating layer (510) concomitantly moves with said rotating magnetic cylinder (560) in the vicinity of the static magnetic assembly (500) described herein. According to said embodiment, the magnetic assembly (500) described herein is mounted in the vicinity of the rotating magnetic cylinder described herein (560). FIG. 4 of WO 2019/141452 A1 and WO 2019/141/453 A1 disclose processes wherein hard magnetic magnets (x30 in said PCT applications) are simultaneously used with a magnetic-field-generating device (x40 in said PCT applications). According to one embodiment shown for example in FIG. 5E, the method described herein comprises a step ii) of exposing the coating layer (x10) to the magnetic field of a firs magnetic assembly (x00a) described herein, an optional further step of selectively at least partially curing (depicted with a selective curing unit (x80)) one or more first areas of the coating layer (x10) of the radiation curable coating composition of step ii) so as to fix at least a part of the non-spherical magnetic or magnetizable particles in their adopted positions and orientations such that one or more second areas of the coating layer (x10) are not exposed to irradiation; and further subsequently, a step of exposing, in a single step, the coating layer (x10) to the interaction of magnetic fields of a second magnetic assembly (x00b) described herein and of a magnetic-field-generating device comprising one or more hard magnetic magnets (M1), the one or more hard magnetic magnets (M1) being preferably mounted on a rotating magnetic cylinder (x60) also acting as transferring device. The method described herein comprises the step iii) of at least partially curing the radiation curable coating composition of step ii), wherein said step may be carried out partially simultaneously with or subsequently to step ii). During the method described herein, the magnetic assemblies (x00a and x00b) described herein are preferably static devices and the one or more hard magnetic magnets (M1) concomitantly move with the substrate (x20) carrying the coating layer (x10). The method described in FIG. 5E may be carried out with the substrate (520) facing the magnetic assembly (500); however, the same method may be carried out with the coating layer (510 not shown in FIG. 5E) facing the magnetic assembly (500).

According to one embodiment shown for example in FIG. 5D, the method described herein comprises a step ii) of exposing, in a single step, the coating layer (x10) to the interaction of magnetic fields of the magnetic assembly (x00) described herein and of one or more soft magnetic plates (M1) carrying one or more indicia in the form of voids and/or indentations and/or protrusions, said soft magnetic plates being preferably mounted on a rotating magnetic cylinder or being placed on a moveable device below the substrate (x20). The method described herein comprises the step iii) of at least partially curing the radiation curable coating composition of step ii) to allow the platelet-shaped magnetic or magnetizable pigment particles to be fixed in their adopted positions and orientations, wherein said at least partially curing step may be carried out partially simultaneously with or subsequently to step ii). During the method described herein, the magnetic assembly (x00) described herein is preferably a static device and the one or more soft magnetic plates (M1) concomitantly move with the substrate (x20) carrying the coating layer (x10). Suitable soft magnetic plates carrying one or more indicia in the form of voids and/or indentations and/or protrusions are either made of one or more metals, alloys or compounds of high magnetic permeability or are made of a composite comprising from about 25 wt-% to about 95 wt-% of soft magnetic particles dispersed in a non-magnetic material, the weight percents being based on the total weight of the soft magnetic plate and are disclosed in WO 2018/033512 A1 and WO 2018/019594 A1. FIG. 3 of WO 2018/033512 A1 disclose a process wherein a soft magnetic plate (x10 in said PCT application) is also used in addition to a magnetic-field-generating device (x40 in said PCT application). FIG. 4 of WO 2018/019594 A1 disclose a process wherein a soft magnetic plate (x50 in said PCT application) is also used in addition to a magnetic-field-generating device (x60 in said PCT application). According to said embodiment, the magnetic assembly (x00) described herein is mounted in the vicinity of the transferring device described herein, wherein said transferring device being preferably one or more rotating cylinders. According to one embodiment shown for example in FIG. 5E, the method described herein comprises a step ii) of exposing the coating layer (x10) to the magnetic field of a first magnetic assembly (x00a) described herein, an optional further step of a step of selectively at least partially curing (depicted with a selective curing unit (x80)) one or more first areas of the coating layer (x10) of the radiation curable coating composition of step ii) so as to fix at least a part of the non-spherical magnetic or magnetizable particles in their adopted positions and orientations such that one or more second areas of the coating layer (x10) are not exposed to irradiation; and further subsequently, a step of exposing, in a single step, the coating layer (x10) to the interaction of magnetic fields of a second magnetic assembly (x00b) described herein and of one or more soft magnetic plates (M1) carrying one or more indicia in the form of voids and/or indentations and/or protrusions, said soft magnetic plates being preferably mounted on a rotating magnetic cylinder or being placed on a moveable device below the substrate (x20). The method described herein comprises the step iii) of at least partially curing the radiation curable coating composition of step ii) to allow the platelet-shaped magnetic or magnetizable pigment particles to be fixed in their adopted positions and orientations, wherein said at least partially curing step may be carried out partially simultaneously with or subsequently to step ii). During the method described herein, the magnetic assemblies (x00 and x00b) described herein are preferably static devices and the one or more hard soft magnetic plates (M1) concomitantly move with the substrate (x20) carrying the coating layer (x10). The method described in FIG. 5E may be carried out with the substrate (520) facing the magnetic assembly (500); however, the same method may be carried out with the coating layer (510 not shown in FIG. 5E) facing the magnetic assembly (500).

According to one embodiment shown for example in FIG. 5A-C, the method described herein comprises the step ii) of exposing the coating layer (x10) to the magnetic field of the magnetic assembly (x00); and, subsequently to this step ii), a further step of selectively at least partially curing (depicted with a selective curing unit (580)) one or more first areas of the coating layer (x10) of the radiation curable coating composition of step ii) so as to fix at least a part of the non-spherical magnetic or magnetizable particles in their adopted positions and orientations such that one or more second areas of the coating layer (x10) are not exposed to irradiation; and further subsequently, a step of exposing the coating layer (x10) to the magnetic field of a magnetic-field-generating device comprising one or more hard magnetic magnets (M1), the one or more hard magnetic magnets (M1) being preferably mounted on a rotating magnetic cylinder (x60) also acting as transferring device, so as to mono-axially re-orient at least a part of the platelet-shaped magnetic or magnetisable particles in the one or more second areas. The method described herein comprises the step iii) of at least partially curing the radiation curable coating composition of step ii), wherein said step may be carried out partially simultaneously with or subsequently to the step of re-orienting the platelet-shaped magnetic or magnetisable particles, preferably partially simultaneously with said step of re-orienting. During the method described herein, the magnetic assembly (x00) described herein is preferably a static device and the one or more hard magnetic magnets (M1) concomitantly move with the substrate (x20) carrying the coating layer (x10). FIG. 5A-C illustrate said method, wherein the one or more magnets (M1) of the magnetic-field-generating device are mounted on the rotating magnetic cylinder described herein (560) and the substrate (520) carrying the coating layer (510, not shown in FIG. 5A) concomitantly moves with said rotating magnetic cylinder (560) in the vicinity of the static magnetic assembly (500) described herein. According to one embodiment shown in FIG. 5A, the magnetic assembly (500) described herein is mounted in the vicinity of the transferring device described herein, wherein said transferring device is preferably a belt comprising grippers. According to another embodiment shown in FIG. 5B-C, the magnetic assembly (500) described herein is mounted in the vicinity of the transferring device described herein, wherein said transferring device preferably being one or more cylinders (570-a and 570-b).

According to one embodiment, the method described herein comprises the step ii) of exposing the coating layer (x10) to the magnetic field of the magnetic assembly (x00) and a further step of subsequently exposing the coating layer (x10) to the magnetic field of a first magnetic-field-generating device comprising one or more hard magnetic magnets (M1a), said one or more hard magnetic magnets (M1) being preferably mounted on a rotating magnetic cylinder (x60a) also acting as transferring device, so as to mono-axially re-orient at least a part of the platelet-shaped magnetic or magnetisable particles, said further step being carried out subsequently to step ii); a further step of selectively at least partially curing (depicted with a selective curing unit (x80)) one or more first areas of the coating layer (x10) of the radiation curable coating composition of step ii) so as to fix at least a part of the non-spherical magnetic or magnetizable particles in their adopted positions and orientations such that one or more second areas of the coating layer (x10) are not exposed to irradiation; and further subsequently, a step of exposing the coating layer (x10) to the magnetic field of a second magnetic-field-generating device comprising one or more hard magnetic magnets (M1b), said one or more hard magnetic magnets (M1b) being preferably mounted on a rotating magnetic cylinder (x60b) also acting as transferring device. Partially simultaneously with or subsequently to the step of orienting the coating layer (x10) to the magnetic field of the second magnetic-field-generating device comprising one or more hard magnetic magnets (M1), the method described herein comprises the step of at least partially curing the radiation curable coating composition.

According to one embodiment, the method described herein comprises the step ii) of exposing the coating layer (x10) to the magnetic field of a first magnetic assembly (x00a) and a further step of subsequently exposing the coating layer (x10) to the magnetic field of a first magnetic-field-generating device comprising one or more hard magnetic magnets (M1), said one or more hard magnetic magnets (M1a) being preferably mounted on a rotating magnetic cylinder (x60a) also acting as transferring device, so as to mono-axially re-orient at least a part of the platelet-shaped magnetic or magnetisable particles, said further step being carried out subsequently to step ii); a further step of selectively at least partially curing (depicted with a selective curing unit (x80)) one or more first areas of the coating layer (x10) of the radiation curable coating composition of step ii) so as to fix at least a part of the non-spherical magnetic or magnetizable particles in their adopted positions and orientations such that one or more second areas of the coating layer (x10) are not exposed to irradiation; further subsequently, a step of exposing the coating layer (x10) to the magnetic field of a second magnetic assembly (x00b); further subsequently, a step of exposing the coating layer (x10) to the magnetic field of a second magnetic-field-generating device comprising one or more hard magnetic magnets (M1b), said one or more hard magnetic magnets (M1b) being preferably mounted on a rotating magnetic cylinder (x60b) also acting as transferring device. Partially simultaneously with or subsequently to the step of orienting the coating layer (x10) to the magnetic field of the second magnetic-field-generating device comprising one or more hard magnetic magnets (M1b), the method described herein comprises the step of at least partially curing the radiation curable coating composition.

According to one embodiment, the method described herein comprises the step ii) of exposing the coating layer (x10) to the magnetic field of a first magnetic assembly (x00a) such as those described herein; and, subsequently to this step ii), a further step of selectively at least partially curing one or more first areas of the coating layer (x10) of the radiation curable coating composition of step ii) so as to fix at least a part of the non-spherical magnetic or magnetizable particles in their adopted positions and orientations such that one or more second areas of the coating layer (x10) are not exposed to irradiation; and further subsequently, a single step of exposing the coating layer (x10) to the interaction of the magnetic fields of a second magnetic assembly (x00b) such as those described herein and of a magnetic-field-generating device comprising one or more hard magnetic magnets (M1), the one or more hard magnetic magnets (M1) being preferably mounted on a rotating magnetic cylinder (x60). Partially simultaneously with or subsequently to the step of orienting the coating layer (x10) to the interaction of the magnetic fields of the second magnetic assembly (x00b) and of the magnetic-field-generating device, the method described herein comprises the step of at least partially curing the radiation curable coating composition. During the method described herein, the magnetic assemblies (x00) described herein are preferably static devices and the magnetic-field-generating devices comprising the one or more hard magnetic magnets (M1) concomitantly move with the substrate (x20) carrying the coating layer (x10) and the substrate (x20) carrying the coating layer (x10) concomitantly moves with said rotating magnetic cylinders in the vicinity of the static magnetic assemblies (x00) described herein.

According to one embodiment, the method described herein comprises the step ii) of exposing the coating layer (x10) to the magnetic field of a first magnetic assembly (x00a) such as those described herein; and, subsequently to this step ii), a further step of selectively at least partially curing one or more first areas of the coating layer (x10) of the radiation curable coating composition of step ii) so as to fix at least a part of the non-spherical magnetic or magnetizable particles in their adopted positions and orientations such that one or more second areas of the coating layer (x10) are not exposed to irradiation; and further subsequently, a single step of exposing the coating layer (x10) to the interaction of the magnetic fields of a second magnetic assembly (x00b) such as those described herein and of one or more soft magnetic plates such as those described herein. Partially simultaneously with or subsequently to the step of orienting the coating layer (x10) to the interaction of the magnetic fields of the magnetic assembly (x00b) and the soft magnetic plate, the method described herein comprises the step of at least partially curing the radiation curable coating composition.

According to one embodiment shown for example in FIG. 5F, the method described herein comprises the step ii) of exposing, in a single step, the coating layer (x10) to the interaction of magnetic fields of a first magnetic assembly (x00a) such as those described herein and of a first magnetic-field-generating device comprising one or more hard magnetic magnets (M1a), the one or more hard magnetic magnets (M1a) being preferably mounted on a rotating magnetic cylinder (x60a) also acting as a transferring device; a further step of selectively at least partially curing one or more first areas of the coating layer (x10) of the radiation curable coating composition of step ii) so as to fix at least a part of the non-spherical magnetic or magnetizable particles in their adopted positions and orientations such that one or more second areas of the coating layer (x10) are not exposed to irradiation; further subsequently, a step of exposing the coating layer (x10) to the magnetic field of a second magnetic assembly (x00b); further subsequently, exposing the coating layer (x10) to the magnetic field of a second magnetic-field-generating device comprising one or more hard magnetic magnets (M1b), said one or more hard magnetic magnets (M1) being preferably mounted on a rotating magnetic cylinder (x60b) also acting as transferring device. Partially simultaneously with or subsequently to the step of orienting the coating layer (x10) to the magnetic field of the second magnetic-field-generating device comprising the one or more hard magnetic magnets (M1b), the method described herein comprises the step of at least partially curing the radiation curable coating composition.

According to one embodiment shown for example in FIG. 5F, the method described herein comprises the step ii) of exposing, in a single step, the coating layer (x10) to the interaction of magnetic fields of a first magnetic assembly (x00a) such as those described herein and of one or more soft magnetic plates (M1a) such as those described herein; a further step of selectively at least partially curing one or more first areas of the coating layer (x10) of the radiation curable coating composition of step ii) so as to fix at least a part of the non-spherical magnetic or magnetizable particles in their adopted positions and orientations such that one or more second areas of the coating layer (x10) are not exposed to irradiation; further subsequently, a step of exposing the coating layer (x10) to the magnetic field of a second magnetic assembly (x00b); further subsequently, a step of exposing the coating layer (x10) to the magnetic field of a magnetic-field-generating device comprising one or more hard magnetic magnets (Mb1), said one or more hard magnetic magnets (M1b) being preferably mounted on a rotating magnetic cylinder (x60) also acting as transferring device. Partially simultaneously with or subsequently to the step of orienting the coating layer (x10) to the magnetic field of the magnetic-field-generating device comprising the one or more hard magnetic magnets (M1b), the method described herein comprises the step of at least partially curing the radiation curable coating composition.

According to one embodiment shown for example in FIG. 5G, the method described herein comprises the step ii) of exposing, in a single step, the coating layer (x10) to the interaction of magnetic fields of a first magnetic assembly (x00a) such as those described herein and a first magnetic-field-generating device comprising one or more hard magnetic magnets (M1a), the one or more hard magnetic magnets (M1a) being preferably mounted on a rotating magnetic cylinder (x60a) also acting as a transferring device; a further step of selectively at least partially curing one or more first areas of the coating layer (x10) of the radiation curable coating composition of step ii) so as to fix at least a part of the non-spherical magnetic or magnetizable particles in their adopted positions and orientations such that one or more second areas of the coating layer (x10) are not exposed to irradiation; further subsequently, a step of exposing the coating layer (x10) to the magnetic field of a second magnetic assembly (x00b); and further subsequently exposing, in a single step, the coating layer (x10) to the interaction of magnetic fields of a third magnetic assembly (x00c) such as those described herein and of a second magnetic-field-generating device comprising one or more hard magnetic magnets (M1b), the one or more hard magnetic magnets (M1) being preferably mounted on a rotating magnetic cylinder (x60b) also acting as a transferring device. Partially simultaneously with or subsequently to the step of orienting the coating layer (x10) to the interaction of the magnetic fields of the second magnetic assembly (x00b) and of the second magnetic-field-generating device, the method described herein comprises the step of at least partially curing the radiation curable coating composition.

According to one embodiment shown for example in FIG. 5G, the method described herein comprises the step ii) of exposing, in a single step, the coating layer (x10) to the interaction of magnetic fields of a first magnetic assembly (x00a) such as those described herein and a first magnetic-field-generating device comprising one or more hard magnetic magnets (M1a), the one or more hard magnetic magnets (M1a) being preferably mounted on a rotating magnetic cylinder (x60a) also acting as a transferring device; a further step of selectively at least partially curing one or more first areas of the coating layer (x10) of the radiation curable coating composition of step ii) so as to fix at least a part of the non-spherical magnetic or magnetizable particles in their adopted positions and orientations such that one or more second areas of the coating layer (x10) are not exposed to irradiation; further subsequently, a step of exposing the coating layer (x10) to the magnetic field of a second magnetic assembly (x00b); and further subsequently exposing, in a single step, the coating layer (x10) to the interaction of magnetic fields of a third magnetic assembly (x00c) such as those described herein and of one or more soft magnetic plates (M1b) such as those described herein. Partially simultaneously with or subsequently to the step of orienting the coating layer (x10) to the interaction of the magnetic fields of the third magnetic assembly (x00c) and of the one or more soft magnetic plates, the method described herein comprises the step of at least partially curing the radiation curable coating composition.

According to one embodiment shown for example in FIG. 5G, the method described herein comprises the step ii) of exposing, in a single step, the coating layer (x10) to the interaction of magnetic fields of a first magnetic assembly (x00a) such as those described herein and of one or more soft magnetic plates (M1a) such as those described herein; a further step of selectively at least partially curing one or more first areas of the coating layer (x10) of the radiation curable coating composition of step ii) so as to fix at least a part of the non-spherical magnetic or magnetizable particles in their adopted positions and orientations such that one or more second areas of the coating layer (x10) are not exposed to irradiation; further subsequently, a step of exposing the coating layer (x10) to the magnetic field of a second magnetic assembly (x00b); and further subsequently exposing, in a single step, the coating layer (x10) to the interaction of magnetic fields of a third magnetic assembly (x00c) such as those described herein and of a magnetic-field-generating device comprising one or more hard magnetic magnets (M1b), the one or more hard magnetic magnets (M1b) being preferably mounted on a rotating magnetic cylinder (x60) also acting as a transferring device. Partially simultaneously with or subsequently to the step of orienting the coating layer (x10) to the interaction of the magnetic fields of the third magnetic assembly (x00c) and of the second magnetic-field-generating device, the method described herein comprises the step of at least partially curing the radiation curable coating composition.

According to one embodiment shown for example in FIG. 5G, the method described herein comprises the step ii) of exposing, in a single step, the coating layer (x10) to the interaction of magnetic fields of a first magnetic assembly (x00a) such as those described herein and of one or more first soft magnetic plates (M1a) such as those described herein; a further step of selectively at least partially curing one or more first areas of the coating layer (x10) of the radiation curable coating composition of step ii) so as to fix at least a part of the non-spherical magnetic or magnetizable particles in their adopted positions and orientations such that one or more second areas of the coating layer (x10) are not exposed to irradiation; further subsequently, a step of exposing the coating layer (x10) to the magnetic field of a second magnetic assembly (x00b); and further subsequently exposing, in a single step, the coating layer (x10) to the interaction of magnetic fields of a third magnetic assembly (x00c) such as those described herein and of one or more second soft magnetic plates (M1b) such as those described herein. Partially simultaneously with or subsequently to the step of orienting the coating layer (x10) to the interaction of the magnetic fields of the third magnetic assembly (x00c) and of the second soft magnetic plate, the method described herein comprises the step of at least partially curing the radiation curable coating composition.

According to one embodiment shown for example in FIG. 5H, the method described herein comprises the step ii) of a) exposing the radiation curable coating composition to the interaction of the magnetic fields of a first magnetic assembly (x00a) described herein; then b) exposing, in a single step, the coating layer (x10) to the interaction of magnetic fields of a second magnetic assembly (x00b) such as those described herein and a first magnetic-field-generating device comprising one or more hard magnetic magnets (M1a), the one or more hard magnetic magnets (M1) being preferably mounted on a rotating magnetic cylinder (x60a) also acting as a transferring device; a further step of selectively at least partially curing one or more first areas of the coating layer (x10) of the radiation curable coating composition of step ii) so as to fix at least a part of the non-spherical magnetic or magnetizable particles in their adopted positions and orientations such that one or more second areas of the coating layer (x10) are not exposed to irradiation; further subsequently, a step of exposing the coating layer (x10) to the magnetic field of a third magnetic assembly (x00c); and further subsequently exposing, in a single step, the coating layer (x10) to the interaction of magnetic fields of a fourth magnetic assembly (x00d) such as those described herein and of a second magnetic-field-generating device comprising one or more hard magnetic magnets (M1b), the one or more hard magnetic magnets (M1b) being preferably mounted on a rotating magnetic cylinder (x60b) also acting as a transferring device. Partially simultaneously with or subsequently to the step of orienting the coating layer (x10) to the interaction of the magnetic fields of the fourth magnetic assembly (x00c) and of the second magnetic-field-generating device, the method described herein comprises the step of at least partially curing the radiation curable coating composition. The method described in FIG. 5H may be carried out with the substrate (520) facing the magnetic assembly (500); however, the same method may be carried out with the coating layer (510 not shown in FIG. 5H) facing the magnetic assembly (500).

According to one embodiment shown for example in FIG. 5H, the method described herein comprises the step ii) of a) exposing the radiation curable coating composition to the interaction of the magnetic fields of a first magnetic assembly (x00a) described herein; then b) exposing, in a single step, the coating layer (x10) to the interaction of magnetic fields of a second magnetic assembly (x00b) such as those described herein and a first magnetic-field-generating device comprising one or more hard magnetic magnets (M1a), the one or more hard magnetic magnets (M1a) being preferably mounted on a rotating magnetic cylinder (x60) also acting as a transferring device; a further step of selectively at least partially curing one or more first areas of the coating layer (x10) of the radiation curable coating composition of step ii) so as to fix at least a part of the non-spherical magnetic or magnetizable particles in their adopted positions and orientations such that one or more second areas of the coating layer (x10) are not exposed to irradiation; further subsequently, a step of exposing the coating layer (x10) to the magnetic field of a third magnetic assembly (x00c); and further subsequently exposing, in a single step, the coating layer (x10) to the interaction of magnetic fields of a fourth magnetic assembly (x00d) such as those described herein and of one or more soft magnetic plates (M1b) such as those described herein. Partially simultaneously with or subsequently to the step of orienting the coating layer (x10) to the interaction of the magnetic fields of the fourth magnetic assembly (x00d) and of the one or more soft magnetic plates (M1b), the method described herein comprises the step of at least partially curing the radiation curable coating composition. This embodiment is shown in FIG. 5H, wherein the magnets (M1b) of the second magnetic-field-generating device are replaced by the soft magnetic plates. The method described in FIG. 5H may be carried out with the substrate (520) facing the magnetic assembly (500); however, the same method may be carried out with the coating layer (510 not shown in FIG. 5H) facing the magnetic assembly (500).

According to one embodiment shown for example in FIG. 5H, the method described herein comprises the step ii) of a) exposing the radiation curable coating composition to the interaction of the magnetic fields of a first magnetic assembly (x00a) described herein; then b) exposing, in a single step, the coating layer (x10) to the interaction of magnetic fields of a second magnetic assembly (x00b) such as those described herein and of one or more soft magnetic plates (M1a) such as those described herein; a further step of selectively at least partially curing one or more first areas of the coating layer (x10) of the radiation curable coating composition of step ii) so as to fix at least a part of the non-spherical magnetic or magnetizable particles in their adopted positions and orientations such that one or more second areas of the coating layer (x10) are not exposed to irradiation; further subsequently, a step of exposing the coating layer (x10) to the magnetic field of a third magnetic assembly (x00c); and further subsequently exposing, in a single step, the coating layer (x10) to the interaction of magnetic fields of a fourth magnetic assembly (x00) such as those described herein and of a magnetic-field-generating device comprising one or more hard magnetic magnets (M1), the one or more hard magnetic magnets (M1) being preferably mounted on a rotating magnetic cylinder (x60) also acting as a transferring device. Partially simultaneously with or subsequently to the step of orienting the coating layer (x10) to the interaction of the magnetic fields of the fourth magnetic assembly (x00d) and of the second magnetic-field-generating device, the method described herein comprises the step of at least partially curing the radiation curable coating composition. The method described in FIG. 5H may be carried out with the substrate (520) facing the magnetic assembly (500); however, the same method may be carried out with the coating layer (510 not shown in FIG. 5H) facing the magnetic assembly (500).

According to one embodiment shown for example in FIG. 5H, the method described herein comprises the step ii) of a)

exposing the radiation curable coating composition to the interaction of the magnetic fields of a first magnetic assembly (x00a) described herein; then b) exposing, in a single step, the coating layer (x10) to the interaction of the magnetic fields of a second magnetic assembly (x00b) such as those described herein and of one or more first soft magnetic plates (M1a) such as those described herein; a further step of selectively at least partially curing one or more first areas of the coating layer (x10) of the radiation curable coating composition of step ii) so as to fix at least a part of the non-spherical magnetic or magnetizable particles in their adopted positions and orientations such that one or more second areas of the coating layer (x10) are not exposed to irradiation; further subsequently, a step of exposing the coating layer (x10) to the magnetic field of a third magnetic assembly (x00c); and further subsequently exposing, in a single step, the coating layer (x10) to the interaction of magnetic fields of a fourth magnetic assembly (x00d) such as those described herein and of one or more second soft magnetic plates (M1b) such as those described herein. Partially simultaneously with or subsequently to the step of orienting the coating layer (x10) to the interaction of the magnetic fields of the fourth magnetic assembly (x00d) and of the one or more second soft magnetic plates (M1b), the method described herein comprises the step of at least partially curing the radiation curable coating composition. This embodiment is shown in FIG. 5G, wherein the magnets (M1a) of the first magnetic-field-generating device and the magnets (M1b) of the second magnetic-field-generating device are replaced by the soft magnetic plates. The method described in FIG. 5H may be carried out with the substrate (520) facing the magnetic assembly (500); however, the same method may be carried out with the coating layer (510 not shown in FIG. 5H) facing the magnetic assembly (500).

The one or more hard magnetic magnets (M1, M1a, M1b) described herein are not limited and include for example dipole magnets, quadrupolar magnets and combinations thereof. The following hard magnetic magnets are provided herein as illustrative examples.

Optical effects known as flip-flop effects (also referred in the art as switching effect) include a first printed portion and a second printed portion separated by a transition, wherein pigment particles are aligned parallel to a first plane in the first portion and pigment particles in the second portion are aligned parallel to a second plane. Methods and magnets for producing said effects are disclosed for example in in US 2005/0106367 and EP 1 819 525 B1.

Optical effects known as rolling-bar effects as disclosed in US 2005/0106367 may also be produced. A "rolling bar" effect is based on pigment particles orientation imitating a curved surface across the coating. The observer sees a specular reflection zone which moves away or towards the observer as the image is tilted. The pigment particles are aligned in a curving fashion, either following a convex curvature (also referred in the art as negative curved orientation) or a concave curvature (also referred in the art as positive curved orientation). Methods and magnets for producing said effects are disclosed for example in EP 2 263 806 A1, EP 1 674 282 B1, EP 2 263 807 A1, WO 2004/007095 A2, WO 2012/104098 A1, and WO 2014/198905 A2.

Optical effects known as Venetian-blind effects may also be produced. Venetian-blind effects include pigment particles being oriented such that, along a specific direction of observation, they give visibility to an underlying substrate surface, such that indicia or other features present on or in the substrate surface become apparent to the observer while they impede the visibility along another direction of observation Methods and magnets for producing said effects are disclosed for example in U.S. Pat. No. 8,025,952 and EP 1 819 525 B1.

Optical effects known as moving-ring effects may also be produced. Moving-ring effects consists of optically illusive images of objects such as funnels, cones, bowls, circles, ellipses, and hemispheres that appear to move in any x-y direction depending upon the angle of tilt of said optical effect layer. Methods and magnets for producing said effects are disclosed for example in EP 1 710 756 A1, U.S. Pat. No. 8,343,615, EP 2 306 222 A1, EP 2 325 677 A2, WO 2011/092502 A2, US 2013/084411, WO 2014 108404 A2 and WO2014/108303 A1.

Optical effects providing an optical impression of a pattern of moving bright and dark areas upon tilting said effect may also be produced. Methods and magnets for producing said effects are disclosed for example in WO 2013/167425 A1.

Optical effects providing an optical impression of a loop-shaped body having a size that varies upon tilting said effect may also be produced. Methods and magnets for producing these optical effects are disclosed for example in WO 2017/064052 A1, WO 2017/080698 A1 and WO 2017/148789 A1.

Optical effects providing an optical impression of one or more loop-shaped bodies having a shape that varies upon tilting the optical effect layer may also be produced. Methods and magnets for producing said effects are disclosed for example in WO 2018/054819 A1.

Optical effects providing an optical impression of a moon crescent moving and rotating upon tilting may also be produced. Methods and magnets for producing said effects are disclosed for example in WO 2019/215148 A1.

Optical effects providing an optical impression of a loop-shaped body having a size and shape that varies upon tilting may be produced. Methods and magnets for producing said effects are disclosed for example in the co-pending PCT patent application WO 2020/052862 A1.

Optical effects providing an optical impression of an ortho-parallactic effect, i.e. in the present case under the form of a bright reflective vertical bar moving in a longitudinal direction when the substrate is tilted about a horizontal/latitudinal axis or moving in a horizontal/latitudinal direction when the substrate is tilted about a longitudinal axis may be produced. Methods and magnets for producing said effects are disclosed for example in the co-pending PCT patent application PCT/EP2020/052265.

Optical effects providing an optical impression of one loop-shaped body surrounded by one or more loop-shaped bodies, wherein said one or more one or more loop-shaped bodies have their shape and/or their brightness varying upon tilting may be produced. Methods and magnets for producing said effects are disclosed for example in the co-pending PCT patent application PCT/EP2020/054042.

Optical effects providing an optical impression of a plurality of dark spots and a plurality of bright spots moving and/or appearing and/or disappearing not only in a diagonal direction when the substrate is tilted about a vertical/longitudinal axis but also moving and/or appearing and/or disappearing in a diagonal direction when the substrate is tilted may be produced. Methods and magnets for producing said effects are disclosed for example in the co-pending EP patent applications EP19205715.6 and EP19205716.4.

For embodiments of the method described herein wherein a single step of exposing the coating layer (x10) to the interaction of the magnetic fields of the magnetic assembly (x00) described herein and of the magnetic-field-generating device comprising the one or more hard magnetic magnets (M1) described herein, it is preferred to use non-spinning magnetic-field-generating devices. For embodiments of the method described herein wherein an independent step of exposing the coating layer (x10) to the magnetic field of the magnetic-field-generating device comprising the one or more hard magnetic magnets (M1) described herein, non-spinning and spinning magnetic-field-generating devices may be used. Optical effects known as moving-ring effects and obtained with spinning magnetic-field-generating device are disclosed in WO 2014 108404 A2 and WO2014/108303 A1. Optical effects providing an optical impression of at least one circularly moving spot or at least one comet-shaped spot rotating around said center of rotation upon tilting and obtained with spinning magnetic-field-generating device are disclosed are disclosed for example in WO 2019/038371 A1, WO 2019/063778 A1 and WO 2019/038369 A1.

The one or more hard magnetic magnets (M1) described herein may comprise a magnetic plate carrying one or more reliefs, engravings or cut-outs. WO 2005/002866 A1 and WO 2008/046702 A1 are examples for such engraved magnetic plates.

The method described herein comprises the step iii) of at least partially curing the radiation curable coating layer (x10) in a first liquid state to a second state so as to fix/freeze the platelet-shaped magnetic or magnetizable pigment particles in their adopted positions and orientations. The at least partial curing step iii) described herein is carried out by using the curing unit (x50) described herein. For embodiments described herein wherein a step of selectively at least partially curing one or more first areas of the coating layer (x10) such that one or more second areas of the coating layer (x10) are not exposed to irradiation, said step is carried out by using the selective curing unit (x80) described herein.

The radiation curable coating composition described herein must thus noteworthy have a first state, i.e. a liquid or pasty state, wherein the coating composition is not yet cured and wet or soft enough, so that the platelet-shaped magnetic or magnetizable pigment particles dispersed in the composition and in the coating layer are freely movable, rotatable and orientable upon exposure to a magnetic field, and a second cured (e.g. solid or solid-like) state, wherein the platelet-shaped magnetic or magnetizable pigment particles are fixed or frozen in their respective positions and orientations.

Such a first and second state is preferably provided by using a certain type of coating composition. For example, the components of the radiation curable coating composition other than the platelet-shaped magnetic or magnetizable pigment particles may take the form of an ink or coating composition such as those which are used in security applications, e.g. for banknote printing. The aforementioned first and second states can be provided by using a material that shows an increase in viscosity in reaction to a stimulus such as for example an exposure to an electromagnetic radiation. That is, when the fluid binder material is hardened or solidified, said binder material converts into the second state, i.e. a hardened or solid state, where the platelet-shaped magnetic or magnetizable pigment particles are fixed in their current positions and orientations and can no longer move nor rotate within the binder material. As known to those skilled in the art, ingredients comprised in an ink or coating composition to be applied onto a surface such as a substrate and the physical properties of said ink or coating composition must fulfill the requirements of the process used to transfer the ink or coating composition to the substrate surface. Consequently, the binder material comprised in the coating composition described herein is typically chosen among those known in the art and depends on the coating or printing process used to apply the ink or coating composition and the chosen hardening process.

The at least partial curing step iii) include a chemical reaction of the binder and optional initiator compounds and/or optional cross-linking compounds comprised in the radiation curable coating composition. Such a chemical reaction includes the initiation of a chemical reaction by a radiation mechanism including without limitation Ultraviolet-Visible light radiation curing (hereafter referred as UV-Vis curing) and electronic beam radiation curing (E-beam curing) and may be initiated by heat or IR irradiation.

Radiation curing is carried out during the method described herein, and UV-Vis light radiation curing is more preferred, since these technologies advantageously lead to very fast curing processes and hence drastically decrease the preparation time of any article comprising the OEL described herein. Moreover, radiation curing has the advantage of producing an almost instantaneous increase in viscosity of the coating composition after exposure to the curing radiation, thus minimizing any further movement of the particles. In consequence, any loss of orientation after the magnetic orientation step can essentially be avoided. Particularly preferred is radiation-curing by photo-polymerization, under the influence of actinic light having a wavelength component in the UV or blue part of the electromagnetic spectrum (typically 200 nm to 650 nm; more preferably 200 nm to 420 nm). Equipment for UV-visible-curing may comprise a high-power light-emitting-diode (LED) lamp, or an arc discharge lamp, such as a medium-pressure mercury arc (MPMA) or a metal-vapor arc lamp, as the source of the actinic radiation.

Therefore, suitable radiation curable coating composition for the present invention include radiation curable compositions that may be cured by UV-visible light radiation (hereafter referred as UV-Vis-curable) or by E-beam radiation (hereafter referred as EB). According to one particularly preferred embodiment of the present invention, the radiation curable coating composition described herein is a UV-Vis-curable coating composition.

Preferably, the UV-Vis-curable coating composition described herein comprises one or more compounds selected from the group consisting of radically curable compounds and cationically curable compounds. The UV-Vis-curable coating composition described herein may be a hybrid system and comprise a mixture of one or more cationically curable compounds and one or more radically curable compounds. Cationically curable compounds are cured by cationic mechanisms typically including the activation by radiation of one or more photoinitiators which liberate cationic species, such as acids, which in turn initiate the curing so as to react and/or cross-link the monomers and/or oligomers to thereby harden the coating composition. Radically curable compounds are cured by free radical mechanisms typically including the activation by radiation of one or more photoinitiators, thereby generating radicals which in turn initiate the polymerization so as to harden the coating composition. Depending on the monomers, oligomers or prepolymers used to prepare the binder comprised in the UV-Vis-curable coating compositions described herein, different photoinitiators might be used. Suitable examples of free radical photoinitiators are known to those skilled in the art and include without limitation acetophenones, benzophenones, benzyldimethyl ketals, alpha-aminoketones, alphahydroxyketones, phosphine oxides and phosphine oxide derivatives, as well as mixtures of two or more thereof. Suitable examples of cationic photoinitiators are known to those skilled in the art and include without limitation onium salts such as organic iodonium salts (e.g. diaryl iodoinium salts), oxonium (e.g. triaryloxonium salts) and sulfonium salts (e.g. triarylsulphonium salts), as well as mixtures of two or more thereof. Other examples of useful photoinitiators can be found in standard textbooks. It may also be advantageous to include a sensitizer in conjunction with the one or more photoinitiators in order to achieve efficient curing. Typical examples of suitable photosensitizers include without limitation isopropyl-thioxanthone (ITX), 1-chloro-2-propoxy-thioxanthone (CPTX), 2-chloro-thioxanthone (CTX) and 2,4-diethyl-thioxanthone (DETX) and mixtures of two or more thereof. The one or more photoinitiators comprised in the UV-Vis-curable coating compositions are preferably present in a total amount from about 0.1 wt-% to about 20 wt-%, more preferably about 1 wt-% to about 15 wt-%, the weight percents being based on the total weight of the UV-Vis-curable coating compositions.

The radiation curable coating composition described herein may further comprise one or more coloring components selected from the group consisting of organic pigment particles, inorganic pigment particles, and organic dyes, and/or one or more additives. The latter include without limitation compounds and materials that are used for adjusting physical, rheological and chemical parameters of the coating composition such as the viscosity (e.g. solvents, thickeners and surfactants), the consistency (e.g. anti-settling agents, fillers and plasticizers), the foaming properties (e.g. antifoaming agents), the lubricating properties (waxes, oils), UV stability (photostabilizers), the adhesion properties, the antistatic properties, the storage stability (polymerization inhibitors) etc. Additives described herein may be present in the coating composition in amounts and in forms known in the art, including so-called nano-materials where at least one of the dimensions of the additive is in the range of 1 to 1000 nm.

The radiation curable coating composition described herein may further comprise one or more additives including without limitation compounds and materials which are used for adjusting physical, rheological and chemical parameters of the composition such as the viscosity (e.g. solvents and surfactants), the consistency (e.g. anti-settling agents, fillers and plasticizers), the foaming properties (e.g. antifoaming agents), the lubricating properties (waxes), UV reactivity and stability (photosensitizers and photostabilizers) and adhesion properties, etc. Additives described herein may be present in the coating compositions described herein in amounts and in forms known in the art, including in the form of so-called nano-materials where at least one of the dimensions of the particles is in the range of 1 to 1000 nm.

The radiation curable coating composition described herein may further comprise one or more marker substances or taggants and/or one or more machine readable materials selected from the group consisting of magnetic materials (different from the magnetic or magnetizable pigment particles described herein), luminescent materials, electrically conductive materials and infrared-absorbing materials. As used herein, the term "machine readable material" refers to a material which exhibits at least one distinctive property which is detectable by a device or a machine, and which can be comprised in a coating so as to confer a way to authenticate said coating or article comprising said coating by the use of a particular equipment for its detection and/or authentication.

The radiation curable coating compositions described herein may be prepared by dispersing or mixing the platelet-shaped magnetic or magnetizable pigment particles described herein and the one or more additives when present in the presence of the binder material described herein, thus forming liquid compositions. When present, the one or more photoinitiators may be added to the composition either during the dispersing or mixing step of all other ingredients or may be added at a later stage, i.e. after the formation of the liquid coating composition.

The present invention provides the methods described herein and the printing apparatuses described herein to produce optical effect layers (OELs) on the substrates (x20) described herein.

The shape of the coating layer (x10) of the optical effect layers (OELs) described herein may be continuous or discontinuous. According to one embodiment, the shape of the coating layer (x10) represent one or more indicia, dots and/or lines. The shape of the coating layer (x10) may consist of lines, dots and/or indicia being spaced apart from each other by a free area.

The substrate (x20) described herein is preferably selected from the group consisting of papers or other fibrous materials (including woven and non-woven fibrous materials), such as cellulose, paper-containing materials, glasses, metals, ceramics, plastics and polymers, metallized plastics or polymers, composite materials and mixtures or combinations of two or more thereof. Typical paper, paper-like or other fibrous materials are made from a variety of fibers including without limitation abaca, cotton, linen, wood pulp, and blends thereof. As is well known to those skilled in the art, cotton and cotton/linen blends are preferred for banknotes, while wood pulp is commonly used in non-banknote security documents. Typical examples of plastics and polymers include polyolefins such as polyethylene (PE) and polypropylene (PP) including biaxially oriented polypropylene (BOPP), polyamides, polyesters such as poly(ethylene terephthalate) (PET), poly(1,4-butylene terephthalate) (PBT), poly(ethylene 2,6-naphthoate) (PEN) and polyvinylchlorides (PVC). Spunbond olefin fibers such as those sold under the trademark Tyvek® may also be used as substrate. Typical examples of metalized plastics or polymers include the plastic or polymer materials described hereabove having a metal disposed continuously or discontinuously on their surface. Typical example of metals include without limitation aluminum (Al), chromium (Cr), copper (Cu), gold (Au), silver (Ag), alloys thereof and combinations of two or more of the aforementioned metals. The metallization of the plastic or polymer materials described hereabove may be done by an electrodeposition process, a high-vacuum coating process or by a sputtering process. Typical examples of composite materials include without limitation multilayer structures or laminates of paper and at least one plastic or polymer material such as those described hereabove as well as plastic and/or polymer fibers incorporated in a paper-like or fibrous material such as those described hereabove. Of course, the substrate can comprise further additives that are known to the skilled person, such as fillers, sizing agents, whiteners, processing aids, reinforcing or wet strengthening agents, etc. When the OELs produced according to the present invention are used for decorative or cosmetic purposes including for example fingernail lacquers, said OEL may be produced on other type of substrates including nails, artificial nails or other parts of an animal or human being.

Should the OEL produced according to the present invention be on a security document, and with the aim of further increasing the security level and the resistance against counterfeiting and illegal reproduction of said security document, the substrate may comprise printed, coated, or laser-marked or laser-perforated indicia, watermarks, security threads, fibers, planchettes, luminescent compounds, windows, foils, decals and combinations of two or more thereof. With the same aim of further increasing the security level and the resistance against counterfeiting and illegal reproduction of security documents, the substrate may comprise one or more marker substances or taggants and/or machine readable substances (e.g. luminescent substances, UV/visible/IR absorbing substances, magnetic substances and combinations thereof).

If desired, a primer layer may be applied to the substrate prior to the step a). This may enhance the quality of the OEL described herein or promote adhesion. Examples of such primer layers may be found in WO 2010/058026 A2.

With the aim of increasing the durability through soiling or chemical resistance and cleanliness and thus the circulation lifetime of an article, a security document or a decorative element or object comprising the OEL obtained by the method described herein, or with the aim of modifying their aesthetical appearance (e.g. optical gloss), one or more protective layers may be applied on top of the OEL. When present, the one or more protective layers are typically made of protective varnishes. Protective varnishes may be radiation curable compositions, thermal drying compositions or any combination thereof. Preferably, the one or more protective layers are radiation curable compositions, more preferable UV-Vis curable compositions. The protective layers are typically applied after the formation of the OEL.

The optical effect layer (OEL) or the substrate (x20) comprising the one or more optical effect layers (OELs) described herein may be further embossed for example by exerting pressure.

The optical effect layer (OEL) described herein may be further and subsequently to the step of to at least partially curing the radiation curable coating composition described herein be at least partially overprinted with one more inks or coating compositions so as to form one or more printed patterns or security features.

The present invention further provides optical effect layers (OELs) produced by the methods described herein and/or by using the printing apparatuses described herein. Also described herein are uses of the OELs described herein as anti-counterfeit means on documents and articles (in other words for protecting and authenticating documents and articles) as well as for decorative purposes.

The OEL described herein may be provided directly on a substrate on which it shall remain permanently (such as for banknote applications). Alternatively, an optical effect layer may also be provided on a temporary substrate for production purposes, from which the OEL is subsequently removed. This may for example facilitate the production of the optical effect layer (OEL), particularly while the binder material is still in its fluid state. Thereafter, after hardening the coating composition for the production of the OEL, the temporary substrate may be removed from the OEL.

Alternatively, in another embodiment an adhesive layer may be present on the OEL or may be present on the substrate comprising OEL, said adhesive layer being on the side of the substrate opposite to the side where the OEL is provided or on the same side as the OEL and on top of the OEL. Therefore, an adhesive layer may be applied to the OEL or to the substrate, said adhesive layer being applied after the curing step has been completed. Such an article may be attached to all kinds of documents or other articles or items without printing or other processes involving machinery and rather high effort. Alternatively, the substrate described herein comprising the OEL described herein may be in the form of a transfer foil, which can be applied to a document or to an article in a separate transfer step. For this purpose, the substrate is provided with a release coating, on which the OELs are produced as described herein. One or more adhesive layers may be applied over the so produced optical effect layer.

Also described herein are substrates comprising more than one, i.e. two, three, four, etc. optical effect layers (OELs) obtained by the method described herein.

Also described herein are articles, in particular security documents, decorative elements or objects, comprising the optical effect layer (OEL) produced according to the present invention. The articles, in particular security documents, decorative elements or objects, may comprise more than one (for example two, three, etc.) OELs produced according to the present invention.

As mentioned hereabove, the OEL produced according to the present invention may be used for decorative purposes as well as for protecting and authenticating a security document.

Typical examples of decorative elements or objects include without limitation luxury goods, cosmetic packaging, automotive parts, electronic/electrical appliances, furniture and fingernail articles.

Security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, driving licenses, bank cards, credit cards, transactions cards, access documents or cards, entrance tickets, public transportation tickets, academic diploma or titles and the like, preferably banknotes, identity documents, right-conferring documents, driving licenses and credit cards. The term "value commercial good" refers to packaging materials, in particular for cosmetic articles, nutraceutical articles, pharmaceutical articles, alcohols, tobacco articles, beverages or foodstuffs, electrical/electronic articles, fabrics or jewelry, i.e. articles that shall be protected against counterfeiting and/or illegal reproduction in order to warrant the content of the packaging like for instance genuine drugs. Examples of these packaging materials include without limitation labels, such as authentication brand labels, tamper evidence labels and seals. It is pointed out that the disclosed substrates, value documents and value commercial goods are given exclusively for exemplifying purposes, without restricting the scope of the invention.

Alternatively, the optical effect layer (OEL) described herein may be produced onto an auxiliary substrate such as for example a security thread, security stripe, a foil, a decal, a window or a label and consequently transferred to a security document in a separate step.

The skilled person can envisage several modifications to the specific embodiments described above without departing from the spirit of the present invention. Such modifications are encompassed by the present invention.

Further, all documents referred to throughout this specification are hereby incorporated by reference in their entirety as set forth in full herein.

EXAMPLES

The Examples and Comparative Examples have been carried out by using the UV-Vis curable screen-printing ink of the formula given in Table 1 and the first and second magnetic assemblies described herebelow.

TABLE 1

| | |
|---|---|
| Epoxyacrylate oligomer (Allnex) | 28 wt-% |
| Trimethylolpropane triacrylate monomer (Allnex) | 19.5 wt-% |
| Tripropyleneglycol diacrylate monomer (Allnex) | 20 wt-% |
| Genorad 16 (Rahn) | 1 wt-% |
| Aerosil 200 (Evonik) | 1 wt-% |
| Speedcure TPO-L (Lambson) | 2 wt-% |
| Irgacure ® 500 (IGM) | 6 wt-% |
| Genocure ® EPD (Rahn) | 2 wt-% |
| BYK ® 371 (BYK) | 2 wt-% |
| Tego Foamex N (Evonik) | 2 wt-% |
| 7-layer optically variable magnetic pigment particles (*) | 16.5 wt-% |

(*) 7-layer gold-to-green platelet-shaped optically variable magnetic pigment particles having a flake shape of diameter $d_{50}$ about 9.3 µm and thickness about 1 µm, obtained from JDS-Uniphase, Santa Rosa, CA.

Magnetic Assembly According to the Invention
(FIG. 2A)

A magnetic assembly (200) configured for receiving a substrate (220) in an orientation substantially parallel to a first plane was used to bi-axially orient the pigment particles according to the invention. The magnetic assembly (200) comprised a) a first set (S1) comprising a first bar dipole magnet (231) and two second bar dipole magnets ($232_a$ and $232_b$) and a second set (S2) comprising a first bar dipole magnet (231) and two second bar dipole magnets ($232_a$ and $232_b$) and b) a first pair (P1) of third bar dipole magnets ($233_a$ and $233_b$).

The upmost surface of the first bar dipole magnet (231) of the first and second sets (S1, S2), of the second bar dipole magnets ($232_a$ and $232_b$) of the first and second set s (S1, S2) and of the third bar dipole magnets ($233_a$ and $233_b$) of the first pair (P1) were flush with each other.

The third bar dipole magnet ($233_a$) was aligned with the second bar dipole magnet ($232_a$) of the first set (S1) and with the second bar dipole magnet ($232_a$) of the second set (S2) so as form a line. The third bar dipole magnet ($233_b$) was aligned with the second bar dipole magnet ($232_b$) of the first set (S1) and with the second bar dipole magnet ($232_b$) of the second set (S2) so as form a line. For each line described herein, the third bar dipole magnets ($233_a$ and $233_b$) and the two second bar dipole magnets ($232_a$) were spaced apart by a third distance (d3) of 2 mm.

The first bar dipole magnets (231) of the first and second sets (S1, S2) had the following dimensions: first thickness (L1) of 5 mm, first length (L4) of 60 mm and first width (L5) of 40 mm. Each of the second bar dipole magnets ($232_a$ and $232_b$) of the first and second set (S1, S2) had the following dimensions: second thickness (L2) of 10 mm, second length (L6) of 40 mm and second width (L7) of 10 mm. Each of the third bar dipole magnets ($233_a$ and $233_b$) of the first pair (P1) had the following dimensions: third thickness (L3) of 10 mm, third length (L8) of 20 mm and third width (L9) of 10 mm.

The first bar dipole magnet (231) of the first set (S1) and the second bar dipole magnets ($232_a$ and $232_b$) of the first set (S1) was aligned to form a column and the first bar dipole magnet (231) of the second set (S2) and the second bar dipole magnets ($232_a$ and $232_b$) of the second set (S2) was aligned to form a column. For each set (S1, S2) and each column described herein, the first bar dipole magnets (231) and the two second bar dipole magnets ($232_a$ and $232_b$) were spaced apart by a second distance (d2) of 2 mm.

The first bar dipole magnets (231) of the first and second sets (S1, S2) had their magnetic axis oriented to be substantially parallel to the first plane and substantially parallel to the substrate (220), wherein the first bar dipole magnet (231) of the first set (S1) had its magnetic direction opposite to the magnetic direction of the first bar dipole magnet (231) of the second set (S2), and were spaced apart by a first distance (d1) of 24 mm (corresponding to the sum of the third length (L8) and the two third distances (d3)).

The two second bar dipole magnets ($232_a$ and $232_b$) of the first and second set (S1, S2) had their magnetic axis oriented to be substantially perpendicular to the first plane and substantially perpendicular to the substrate (220). The South pole of the second bar dipole magnet (232a) of the first set (S1) pointed towards the first plane and towards the substrate (220), the North pole of the second bar dipole magnet ($232_b$) of the first set (S1) pointed towards the first plane and towards the substrate (220), the North pole of the first bar dipole magnets (231) of the first set (S1) pointed towards the second bar dipole magnet ($232_b$) of the first set (S1). The North pole of the second bar dipole magnet (232a) of the second set (S2) pointed towards the first plane and towards the substrate (220), the South pole of the second bar dipole magnet ($232_b$) of the second set (S2) pointed towards the first plane and towards the substrate (220), the North pole of the first bar dipole magnets (231) of the second set (S2) pointed towards the second bar dipole magnet ($232_a$) of the second set (S2).

The South pole of the third bar dipole magnet ($233_a$) pointed towards the second bar dipole magnet ($232_a$) of the first set (S1), said second bar dipole magnet ($232_a$) having its South pole pointing towards the substrate (220); and the North pole of the third bar dipole magnet ($233_b$) pointed towards the second bar dipole magnet ($232_b$) of the first set (S1), said second bar dipole magnet ($232_b$) having its North pole pointing towards the substrate (220).

The first bar dipole magnets (231) of the first and second sets (S1, S2), the second bar dipole magnets ($232_a$ and $232_b$) of the first and second sets (S1, S2) and the third bar dipole magnets ($233_a$ and $233_b$) of the first pair (P1) were made of NdFeB N42 and were embedded in a non-magnetic supporting matrix (not shown) made of polyoxymethylene (POM) having the following dimensions: 115 mm×115 mm×12 mm.

The first bar dipole magnets (231) of the first and second sets (S1, S2) had their magnetic axis oriented to be substantially parallel to the first plane and substantially parallel to the substrate (220), wherein the first bar dipole magnet (231) of the first set (S1) had its magnetic direction opposite to the magnetic direction of the first bar dipole magnet (231) of the second set (S2) and were spaced apart by a first distance (d1) of 24 mm.

Magnetic Assembly According to the Prior Art
(FIG. 6A-B)

A comparative magnetic assembly (600) configured for receiving a substrate (620) in an orientation substantially parallel to a first plane was used to bi-axially orient the pigment particles. Said comparative magnetic assembly (600) comprised four bar dipole magnets (632a-d) disposed in a staggered fashion according to FIG. 5 of EP 2 157 141 A. The four bar dipole magnets (632a-d) were identical to the second bar dipole magnets ($232_a$ and $232_b$) of the first and second set (S1, S2) described hereabove and were disposed in a staggered fashion, the distance (e1) being 60 mm and the distance (e2) being about 40 mm.

Sample E1 and Comparative Sample C1 (FIG. 7a)

For each sample, the UV-Vis curable screen printing ink of Table 1 was applied onto on a piece of fiduciary paper (BNP paper from Louisenthal, 100 g/m², 60 mm×60 mm) so as to form a coating layer (40 mm×40 mm), wherein said application step was carried out with a laboratory screen printing device using a T90 screen so as to form a coating layer having a thickness of about 20 μm.

While the coating layer was still in a wet and not yet cured state, the substrate (220, 620) was placed on top of the center of a supporting plate (100 mm×100 mm) made of high density polyethylene (HDPE). The supporting plate carrying the substrate (220, 620) and the coating layer was independently moved at an approximate speed of 50 cm/sec above
i) the magnetic assembly (200) illustrated in FIG. 2A for the sample E1
ii) the magnetic assembly (600) illustrated in FIG. 6A for the comparative sample C1,
wherein the substrate (220, 620) faced the magnetic assembly (200, 600) and the distance (h) between the upmost surface of the magnetic assembly (200, 600) and the substrate (220, 620) was 2 mm.

After having moved the supporting plate carrying the substrate (220, 620) and the coating layer at a distance (d⁵) of about 20 cm away from the magnetic assembly (200, 600), the coating layers were independently cured upon exposure during about 0.5 second to a UV-LED-lamp (250, 650) from Phoseon (Type FireFlex 50×75 mm, 395 nm, 8 W/cm2).

The resulting optical effect layer obtained with the magnetic assembly (200) according to the invention is shown in FIG. 7A (left) and the resulting optical effect layer obtained with the comparative magnetic assembly (600) is shown in FIG. 7A (right). As shown in FIG. 7A, the sample prepared according to the process of the invention consisted of a homogeneous layer whereas the comparative sample suffered from the presence of a lighter and a darker band (area within the dotted rectangle) along the edge of the sample parallel to the motion of the substrate (620).

Sample E2 and Comparative Sample C2 (FIG. 7B)

The sample E2 and comparative sample C2 were prepared according to the method described for E1 and C1 hereabove, except that the supporting plate carrying the substrate (220, 620) and the coating layer was moved three times above the magnetic assembly (200, 600) (forth/back/forth before the curing step.

The resulting optical effect layer obtained with the magnetic assembly (200) according to the invention is shown in FIG. 7B (left) and the resulting optical effect layer obtained with the comparative magnetic assembly (600) is shown in FIG. 7B (right). As shown in FIG. 7B, the sample prepared according to the process of the invention consisted of a homogeneous layer whereas the comparative sample suffered from the presence of a lighter and a darker band (area within the dotted rectangle) along the edge of the sample parallel to the motion of the substrate (620).

Sample E3 and Comparative Sample C3 (FIG. 7C)

The sample E3 and comparative sample C3 were prepared according to the method described for E2 and C2 hereabove, except that the distance (h) between the upmost surface of the magnetic assembly (200, 600) and the substrate (220, 620) was 5 mm instead of 2 mm. The increase of the distance (h) was used to mimic an industrial process wherein grippers are conventionally used to hold the sheets or web of substrate in place during said industrial process.

The resulting optical effect layer obtained with the magnetic assembly (200) according to the invention is shown in FIG. 7C (left) and the resulting optical effect layer obtained with the comparative magnetic assembly (600) is shown in FIG. 7C (right). As shown in FIG. 7C, the sample prepared according to the process of the invention consisted of a homogeneous layer whereas the comparative sample suffered from the presence of two lighter and two darker bands (areas within the dotted rectangle) along the edges of the sample parallel to the motion of the substrate (620).

As shown in FIG. 7A-C (left), the optical effect layers (OELs) prepared according to the method of the present invention (E1-E3) with a magnetic assembly (200) according to the invention exhibited a homogeneous aspect due to an optimal bi-axial orientation of the platelet-shaped magnetic or magnetisable pigment particles. In particular, the improved bi-axially orientation of the platelet-shaped magnetic or magnetisable pigment particles to have both their X-axes and Y-axes substantially parallel to the substrate surface allowed to produce optical effect layers exhibiting a sheet-like surface over the whole surface. As shown in FIG. 7A-C (right), the optical effect layers prepared according to the comparative method of the prior art (C1-C3) with a comparative magnetic assembly (600) exhibited an inhomogeneous aspect.

As shown in FIG. 7A (left), a single pass on the magnetic assembly (200) of the present invention allowed the preparation of a homogeneous optical effect layer. As shown in FIG. 7B (left), the increase of passes on the magnetic assembly (200) of the present invention also allowed the preparation of a homogeneous optical effect layer. As shown in FIG. 7C (left), an increase of the distance (h) between the magnetic assembly (200) and the substrate (220) still allowed the preparation of a homogeneous optical effect layer whereas the same increase of the distance (h) further negatively impacted the optical appearance of the optical effect layer obtained with the comparative method using a comparative magnetic assembly.

The invention claimed is:

1. A magnetic assembly for producing an optical effect layer on a substrate, said magnetic assembly being configured for receiving the substrate in an orientation that deviates not more than 10° from parallel alignment to a first plane and above the first plane, and further comprising:
a) at least a first set and a second set, each of the first and second sets comprising:
i. one first bar dipole magnet
having a first thickness (L1), a first length (L4) and a first width (L5), and
having its magnetic axis oriented in a position that does not deviate than 10° from parallel alignment to the first plane,
ii. two second bar dipole magnets
having a second thickness (L2), a second length (L6) and a second width (L7),
each of the two second bar dipole magnets having an upmost surface, wherein the upmost surfaces of the two second bar dipole magnets are flush with each other, and magnetic axes of each of two second bar dipole magnets are oriented in a position that does not deviate than 10° from perpendicular alignment to the first plane,
the first plane being located above the upmost surface of the two second bar dipole magnets
the first bar dipole magnet of the first set having a magnetic direction opposite to the magnetic direction of the first bar dipole magnet of the second set,
the first bar dipole magnets of the first and second sets being spaced apart by a first distance (d1),
the first length (L4) and first width (L5) of the first bar dipole magnet of the first set being within ±5% of the first length (L4) and first width (L5) of the first bar dipole magnet of the second set, respectively, and
the second lengths (L6) and second widths (L7) of the two second bar dipole magnets of the first set being within ±5% of the second lengths (L6) and second widths (L7) of the two second bar dipole magnets of the second set, respectively,
the first bar dipole magnet and the second bar dipole magnets of each of the first and second sets being aligned to form a column, in that the first bar dipole magnet of the first and second sets is respectively placed between and spaced apart from the second bar dipole magnets by a second distance (d2),
a value of the first width (L5) being within ±5% of a value of the second length (L6),
a North pole of one second bar dipole magnet of each of the first and second sets pointing towards the first plane and a North Pole of the first bar dipole magnet pointing towards said one second bar dipole magnet of each of the first and second sets, and a South pole of another of the second bar dipole magnet of each of the first and second sets pointing towards the first plane and a South Pole of the first bar dipole magnet pointing towards said another second bar dipole magnet of each of the first and second sets, and further comprising:
b) a first pair (P1) of third bar dipole magnets
having a third thickness (L3), a third length (L8) and a third width (L9) and
magnetic axes of the first pair of third bar dipole magnets are oriented in a position that does not deviate than 10° from parallel alignment to the first plane,
the second width (L7) of the two second bar dipole magnets of the first and second sets being within ±5% of the third width (L9) of the third bar dipole magnets,
each of the third bar dipole magnets being aligned with one second bar dipole magnet of the first set and one second bar dipole magnet of the second set so as to form two lines, the third bar dipole magnets being placed between and spaced apart from the respective second bar dipole magnets by a third distance (d3),
North poles of the third bar dipole magnets respectively pointing towards one of the second bar dipole magnets having North Poles pointing towards the first plane or South poles of the third bar dipole magnets respectively pointing towards one of the second bar dipole magnets having South Poles pointing towards the first plane,
wherein the first bar dipole magnets of the first and second sets, the second bar dipole magnets of the first and second sets, and the third bar dipole magnets are at least partially embedded in a non-magnetic supporting matrix.

2. The magnetic assembly according to claim 1, wherein the first thickness (L1) of the first bar dipole magnets of the first and second sets is equal to or smaller than the second thickness (L2) of the second bar dipole magnets of the first and second sets;
the first thickness (L1) of the first bar dipole magnets of the first and second sets is equal to or smaller than the third thickness (L3) of the third bar dipole magnets of the first pair (P1);
wherein the second distance (d2) between the first bar dipole magnet and the second bar dipole magnets is larger than or equal to 0 and smaller than or equal to ½ of the first thickness (L1) of the first bar dipole magnets (0≤d2≤½ L1); and
wherein the third distance (d3) between the third bar dipole magnets of the first pair (P1) and the second bar dipole magnets of the first and second sets is larger than or equal to 0 and smaller than or equal to ½ of the first thickness (L1) of the first bar dipole magnets (0≤d3≤½L1).

3. The magnetic assembly according to claim 1, wherein the upmost surface of the second bar dipole magnets are flush with the upmost surfaces of the third bar dipole magnets.

4. The magnetic assembly according to claim 1, wherein the first distance (d1) between the first bar dipole magnets of the first and second sets is greater than or equal to 15% of the first length (L4) and smaller than or equal to 150% of the first length (L4)(0.15*L4≤d1≤1.5*L4).

5. The magnetic assembly according to claim 1, further comprising one or more combinations comprising:
i) a (2+i)th set ($S_{2+i}$)(i=a whole number greater than 0) comprising:
one further first bar dipole magnet having the first thickness (L1), the first length (L4) and the first width (L5), and having its magnetic axis oriented in a position that does not deviate than 10° from parallel alignment to the first plane, and
two further second bar dipole magnets having the second thickness (L2), the second length (L6) and the second width (L7), each of the two second bar dipole magnets having an upmost surface, wherein upmost surfaces of the two second bar dipole magnets are flush with each other, and magnetic axes of the two second bar dipole magnets are oriented in a position that does not deviate than 10° from perpendicular alignment to the first plane,
the first bar dipole magnet of the (2+i)th set ($S_{2+i}$) having a magnetic direction opposite to the magnetic direction of the first bar dipole magnet of the (2+i−1)th set ($S_{2+i-1}$)
the first bar dipole magnets of the (2+i)th and (2+i−1)th sets ($S_{2+i}$, $S_{2+i-1}$) being spaced apart by the first distance (d1),
the first bar dipole magnet of the (2+i)th set ($S_{2+i}$) having the length (L5) and width (L4) within ±5% of the length (L5) and width (L4) of the first bar dipole magnet of the (2+i−1)th set ($S_{2+i-1}$), and
the two second bar dipole magnets of the (2+i)th set ($S_{2+i}$) having lengths (L6) and widths (L7) within ±5% of lengths (L6) and widths (L7) of the two second bar dipole magnets of the (2+i−1)th set ($S_{2+i-1}$), respectively,
the first bar dipole magnet and the second bar dipole magnets being aligned to form a column, in that the first bar dipole magnet of the (2+i)th set ($S_{2+i}$) is placed between and spaced apart from the second bar dipole magnets by the second distance (d2),
the first and second lengths (L4 and L6) having a value within ±5% of each other, the North pole of one of the second bar dipole magnets of the (2+i)th set ($S_{2+i}$) pointing towards the first plane and the North Pole of the first bar dipole magnet pointing towards that second bar dipole magnet, and ii) a (1+i)th pair ($P_{i+1}$) of third bar dipole magnets having the third thickness (L3), the third length (L9) and the third width (L8) and magnetic axes of the (1+i)th pair ($P_{i+1}$) of third bar dipole magnets being oriented in a position that does not deviate than 10° from parallel alignment to the magnetic axes of the third bar dipole magnets of a (1+i−1)th pair ($P_{1+i-1}$), each of the third bar dipole magnets being aligned with one second bar dipole magnet of the (2+i)th set ($S_{2+i}$) and one second bar dipole magnet of the (2+i−1)th set ($S_{2+i-1}$) so as to form two lines, the third bar dipole magnets being placed between and spaced apart from the respective second bar dipole magnets by the third distance (d3), the North poles of the third bar dipole magnets respectively pointing towards one of the second bar dipole magnets of the (2+i)th and (2+i−1)th sets ($S_{2+i}$, $S_{2+i-1}$) and the North Poles of said ones of the second bar dipole magnets pointing towards the first plane or the South poles of the third bar dipole magnets respectively pointing towards one of the second bar dipole magnets of the (2+i)th and (2+i−1)th sets ($S_{2+i}$, $S_{2+i-1}$) and the South Poles of said ones of the second bar dipole magnets pointing towards the first plane, wherein the first bar dipole magnets of the (2+i)th set ($S_{2+i}$), the second bar dipole magnets of the (2+i)th set ($S_{2+i}$), and the third bar dipole magnets of the (1+i)th pair ($P_{1+i}$) are at least partially embedded in the non-magnetic supporting matrix.

6. A printing apparatus comprising the magnetic assembly according to claim 1 being mounted in the vicinity of a transferring device.

7. A method for producing an optical effect layer on a substrate comprising the steps of:

i) applying on a substrate surface a radiation curable coating composition comprising platelet-shaped magnetic or magnetisable pigment particles, wherein an X-axis and a Y-axis define a plane of predominant extension of the particles, said radiation curable coating composition being in a first, liquid state so as to form a coating layer;

ii) exposing the coating layer to a magnetic field of the magnetic assembly recited in claim 1 so as to bi-axially orient at least a part of the platelet-shaped magnetic or magnetisable pigment particles;

iii) at least partially curing the radiation curable coating composition of step ii) to a second, solid state so as to fix the platelet-shaped magnetic or magnetisable pigment particles in-their adopted positions and orientations.

8. The method according to claim 7, further comprising a further step of exposing the coating layer to a magnetic field of a magnetic-field-generating device so as to re-orient at least a part of the platelet-shaped magnetic or magnetisable particles, said further step being carried out subsequently to step ii).

9. The method according to claim 8, wherein a step of selectively at least partially curing one or more first areas of the coating layer of the radiation curable coating composition of step ii) is carried out so as to fix at least a part of the platelet-shaped magnetic or magnetisable particles in adopted positions and orientations, such that one or more second areas of the coating layer remain unexposed to irradiation, said step being carried out prior to, partially simultaneously with or subsequently to the step of further exposing the coating layer to the magnetic field of the magnetic-field-generating device.

10. The method according to claim 7, wherein the coating layer is exposed, in a single step, to the interaction of magnetic fields of the magnetic assembly and a magnetic-field-generating device comprising one or more hard magnetic magnets, the magnetic-field-generating device being mounted on a rotating magnetic cylinder or being a moveable magnetic-field-generating device.

11. The method according to claim 7, wherein the coating layer is exposed, in a single step, to the interaction of the magnetic fields of the magnetic assembly and one or more soft magnetic plates carrying one or more indicia in the form of voids and/or indentations and/or protrusions, said one or more soft magnetic plates being placed on a rotating magnetic cylinder or being placed on a moveable device below the substrate.

12. The method according to claim 7, wherein a distance between the upmost surface of the first bar dipole magnets and the substrate is greater than 0 and smaller than or equal to about 20 mm.

13. The method according to claim 7, wherein step iii) is carried out by UV-Vis light radiation curing.

14. The method according to claim 7, wherein at least a part of the platelet-shaped magnetic or magnetisable particles is constituted by platelet-shaped optically variable magnetic or magnetisable pigment particles.

15. The magnetic assembly according to claim 2, wherein a ratio of the second thickness (L2) of the second bar dipole magnets of the first and second sets over the first thickness (L1) of the first bar dipole magnets of the first and second sets (L2/L1) is equal to or smaller than 3 and greater than or equal to 1 (1≤L2/L1≤3), or wherein a ratio of the third thickness (L3) of the third bar dipole magnets of the first pair over the first thickness (L1) of the first bar dipole magnets of the first and second sets (L3/L1) is equal to or smaller than 3 and greater than or equal to 1 (1≤L3/L1≤3).

16. The magnetic assembly according to claim 4, wherein the first distance (d1) between the first bar dipole magnets of the first and second sets is greater than or equal to 25% of the first length (L4) and smaller than or equal to 120% of the first length (L4) (0.25*L4≤d1≤1.2*L4).

17. The magnetic assembly according to claim 4, wherein the first distance (d1) between the first bar dipole magnets of the first and second sets is greater than or equal to 25% of the first length (L4) and smaller than or equal to 80% of the first length (L4) (0.25*L4≤d1≤0.8*L4).

18. The printing apparatus according to claim 6, wherein the transferring device is selected from the group consisting of chains, belts, cylinders and combinations thereof.

19. The method according to claim 12, wherein the distance between the upmost surface of the first bar dipole magnets and the substrate is smaller than or equal to about 10 mm and greater than about 2 mm.

20. The method according to claim 14, wherein the platelet-shaped optically variable magnetic or magnetisable pigment particles are selected from the group consisting of magnetic thin-film interference pigments, magnetic cholesteric liquid crystal pigments and mixtures thereof.

* * * * *